United States Patent
Denda et al.

(10) Patent No.: US 9,802,363 B2
(45) Date of Patent: Oct. 31, 2017

(54) METHOD FOR PRODUCING OBJECT

(71) Applicant: Seiko Epson Corporation, Tokyo (JP)

(72) Inventors: Atsushi Denda, Chino (JP); Kenji Kitada, Matsumoto (JP); Maki Nariai, Shiojiri (JP)

(73) Assignee: Seiko Epson Corporation (JP)

( * ) Notice: Subject to any disclaimer, the term of this patent is extended or adjusted under 35 U.S.C. 154(b) by 178 days.

(21) Appl. No.: 14/670,833

(22) Filed: Mar. 27, 2015

(65) Prior Publication Data

US 2015/0273766 A1 Oct. 1, 2015

(30) Foreign Application Priority Data

Mar. 27, 2014 (JP) .................. 2014-065667

(51) Int. Cl.
| | |
|---|---|
| *B29C 59/14* | (2006.01) |
| *B29C 67/00* | (2017.01) |
| *B29C 65/00* | (2006.01) |
| *B29C 37/00* | (2006.01) |
| *B33Y 10/00* | (2015.01) |
| *B33Y 99/00* | (2015.01) |
| *B33Y 40/00* | (2015.01) |

(Continued)

(52) U.S. Cl.
CPC ...... *B29C 67/0085* (2013.01); *B29C 37/0078* (2013.01); *B29C 66/028* (2013.01); *B29C 67/007* (2013.01); *B29C 67/0051* (2013.01); *B29C 67/0055* (2013.01); *B29C 67/0059* (2013.01); *B29C 67/0066* (2013.01); *B29C 67/0077* (2013.01); *B29C 67/0081* (2013.01); *B33Y 10/00* (2014.12); *B33Y 99/00* (2014.12); *B29K 2101/12* (2013.01); *B29K 2105/251* (2013.01); *B33Y 40/00* (2014.12)

(58) Field of Classification Search
CPC ..... B29C 37/0078; B29C 59/08; B29C 59/10; B29C 59/12; B29C 59/14; B29C 59/16; B29C 66/028; B29C 67/0051; B29C 67/0055; B29C 67/0059; B29C 67/0062; B29C 67/0066; B29C 67/007; B29C 67/0074; B29C 67/0077; B29C 67/0081
USPC ....... 264/80, 82, 83, 85, 113, 308, 401, 446, 264/483, 485, 488, 497
See application file for complete search history.

(56) References Cited

U.S. PATENT DOCUMENTS

| | | | |
|---|---|---|---|
| 5,348,693 | A | 9/1994 | Taylor et al. |
| 5,866,058 | A | 2/1999 | Batchelder et al. |

(Continued)

FOREIGN PATENT DOCUMENTS

| | | | |
|---|---|---|---|
| JP | 2003-300029 A | 10/2003 | |
| JP | 2005-235448 A | 9/2005 | |

(Continued)

*Primary Examiner* — Leo B Tentoni
(74) *Attorney, Agent, or Firm* — Harness, Dickey & Pierce, P.L.C.

(57) ABSTRACT

A method for producing an object includes forming and laying N unit layers into which an object is divided, sequentially from a first layer to an Nth layer, using a resin material as a material, or using a resin material for implementing a step, to form the object, the method including performing a discharge treatment at either or both of a timing while forming a unit layer among the N unit layers, and a timing after forming the unit layer, but before starting forming a next unit layer among the N unit layers.

11 Claims, 21 Drawing Sheets

(51) Int. Cl.
*B29K 101/12* (2006.01)
*B29K 105/00* (2006.01)

(56) References Cited

U.S. PATENT DOCUMENTS

| | | | | |
|---|---|---|---|---|
| 6,139,574 | A | * | 10/2000 | Vacanti ............... B29C 67/0066 600/36 |
| 6,259,962 | B1 | | 7/2001 | Gothait |
| 6,730,256 | B1 | * | 5/2004 | Bloomstein ......... B29C 67/0092 264/401 |
| 7,942,987 | B2 | | 5/2011 | Crump et al. |
| 2003/0151167 | A1 | * | 8/2003 | Kritchman .......... B29C 67/0059 264/401 |
| 2003/0235738 | A1 | * | 12/2003 | Zheng ................ H01M 4/9016 429/457 |
| 2007/0175747 | A1 | | 8/2007 | Saeki |
| 2009/0101271 | A1 | | 4/2009 | Ishida |
| 2009/0295032 | A1 | | 12/2009 | Hopkins |
| 2013/0234370 | A1 | | 9/2013 | Suzuki et al. |
| 2015/0030493 | A1 | * | 1/2015 | Scott ................... B29C 67/0077 419/2 |
| 2015/0202894 | A1 | * | 7/2015 | Kitada ...................... D06P 5/30 347/102 |

FOREIGN PATENT DOCUMENTS

| | | |
|---|---|---|
| JP | 4107686 B2 | 6/2008 |
| JP | 2010-521339 A | 6/2010 |
| JP | 2010-241999 A | 10/2010 |
| JP | 2011-527238 A | 10/2011 |
| JP | 2011-245712 A | 12/2011 |
| JP | 2011-245713 A | 12/2011 |
| JP | 2012-071611 A | 4/2012 |
| JP | 2012-111226 A | 6/2012 |
| WO | WO-2012-058278 A2 | 5/2012 |

* cited by examiner

METHOD FOR PRODUCING OBJECT

Japanese Patent Application No. 2014-065667, filed on Mar. 27, 2014, is hereby incorporated by reference in its entirety.

BACKGROUND OF THE INVENTION

The present invention relates to a method for producing an object.

In recent years, there has been an increasing demand for a 3D printer that can produce (model) a three-dimensional object. Such a 3D printer normally implements additive manufacturing. The term "additive manufacturing" refers to a method that forms and lays N unit layers into which the object is divided, sequentially from the first layer to the Nth layer.

Various methods for implementing additive manufacturing have been studied, and some of them have been put to practical use. These methods may utilize a resin material as a material, or utilize a resin material for implementing a step. Specific examples of additive manufacturing that utilizes a resin material include the following methods.

JP-T-2010-521339 and Japanese Patent No. 4107686 disclose a method that utilizes a rapid prototyping system, and repeats a step that melts an ABS resin using an extrusion head, and extrudes the molten ABS resin to form a unit layer to form a 3D object.

JP-A-2011-245712 and JP-A-2011-245713 disclose a method that forms a three-dimensional (3D) object using a modeling slurry that includes an amphiphilic solid polymer.

JP-A-2012-111226 and JP-A-2012-71611 disclose a method that forms a three-dimensional (3D) object by an inkjet optical fabrication method using a photocurable resin component.

A three-dimensional object is normally required to have high accuracy and high strength. However, since a resin material having fluidity may spread during production, or may flow in an unintended direction, it has been difficult to achieve high accuracy when producing a three-dimensional object using a resin material. If the adhesion between the unit layers is low, delamination may occur, and the desired strength may not be obtained.

SUMMARY

Several aspects of the invention may provide a method for producing an object that can improve the accuracy and the strength of an object that is produced by additive manufacturing that utilizes a resin material.

According to one aspect of the invention, there is provided a method for producing an object that includes forming and laying N unit layers into which an object is divided, sequentially from a first layer to an Nth layer, using a resin material as a material, or using a resin material for implementing a step, to form the object, the method including:
performing a discharge treatment at either or both of a timing while forming a unit layer among the N unit layers, and a timing after forming the unit layer, but before starting forming a next unit layer among the N unit layers.

DETAILED DESCRIPTION OF THE EMBODIMENT

Figure 1:
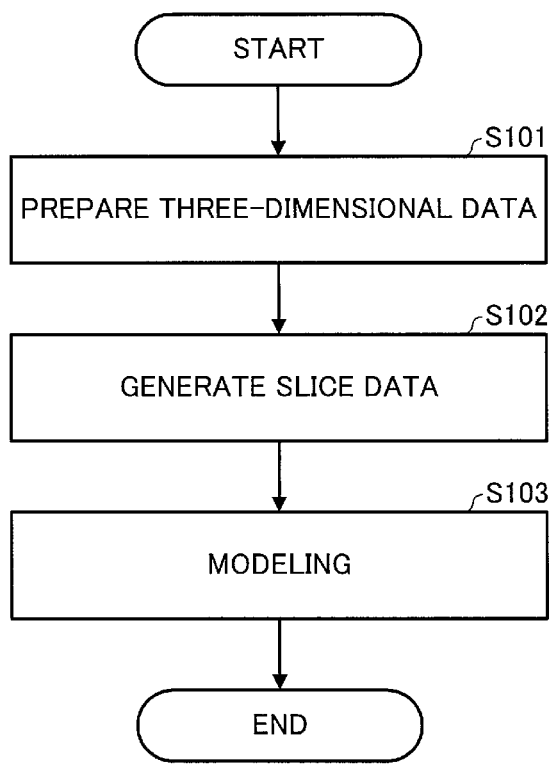
FIG. 1 is a flowchart illustrating an example of the method for producing an object according to several embodiments of the invention.

The invention was conceived in order to solve at least some of the above problems, and may be implemented as described below (see the following application examples).

Application Example 1

According to one embodiment of the invention, a method for producing an object includes forming and laying N unit layers into which an object is divided, sequentially from a first layer to an Nth layer, using a resin material as a material, or using a resin material for implementing a step, to form the object, the method including:
  performing a discharge treatment at either or both of a timing while forming a unit layer among the N unit layers, and a timing after forming the unit layer, but before starting forming a next unit layer among the N unit layers.

According to Application Example 1, it is possible to improve the affinity between the resin materials, or the affinity of the resin material to another material, adjust the state of the interface between the unit layers, or improve the bondability or the reactivity of the resin material, by changing the state or the properties of the interface between the unit layers using the discharge treatment. This makes it possible to improve the accuracy and the strength of the resulting object.

Application Example 2

In the method for producing an object as defined in Application Example 1, the resin material may be a thermoplastic resin that melts due to heating, and the method may include supplying the resin material that has been melted to a stage, and curing the resin material to form the unit layer.

According to Application Example 2, an anchor effect is achieved by moderately roughening the interface between the unit layers using the discharge treatment, and the interfacial strength (adhesion) between the unit layers is improved by forming the upper layer after breaking the polymer bonds on the surface of the unit layer. It is possible to control wettability (degree of wetting) at the interface between the unit layers, and improve the processing accuracy by selecting a gas species corresponding to the object, and performing the discharge treatment.

Application Example 3

In the method for producing an object as defined in Application Example 1,
  the resin material may be a powdered resin material, and the method may include:
  supplying the powdered resin material to a stage, and partially curing the powdered resin material to form the unit layer; and
  performing the discharge treatment after forming the unit layer, but before starting forming the next unit layer.

According to Application Example 3, an anchor effect is achieved by moderately roughening the interface between the unit layers using the discharge treatment, and the interfacial strength (adhesion) between the unit layers is improved by forming the upper layer after breaking the polymer bonds on the surface of the unit layer.

Application Example 4

The method for producing an object as defined in Application Example 1 may include:
  supplying a powdered base material to a stage, applying a liquid material that includes the resin material that binds powder particles in the powdered base material, and curing the liquid material to form the unit layer; and
  performing the discharge treatment at either or both of a timing after applying the liquid material, but before curing the liquid material, and a timing after forming the unit layer, but before starting forming the next unit layer.

According to Application Example 4, an anchor effect is achieved by moderately roughening the interface between the unit layers using the discharge treatment, and the interfacial strength (adhesion) between the unit layers is improved by forming the upper layer after breaking the polymer bonds on the surface of the unit layer. It is possible to control wettability at the interface between the unit layers, and improve the processing accuracy by selecting a gas species corresponding to the object, and performing the discharge treatment. When the liquid material is a radiation-curable material, inhibition of polymerization on the surface of the liquid material due to oxygen can be reduced by performing the discharge treatment after applying the liquid material, but before curing the liquid material, and the radiation-curability of the liquid material is improved.

Application Example 5

The method for producing an object as defined in Application Example 1 may include:
  forming a paste layer that includes a powdered base material, applying a liquid material that includes the resin material that binds powder particles in the powdered base material, and curing the liquid material to form the unit layer; and
  performing the discharge treatment at least one timing among a timing after forming the paste layer, but before applying the liquid material, a timing after applying the liquid material, but before curing the liquid material, and a timing after curing the liquid material, but before starting forming the next unit layer.

When the discharge treatment is performed at a timing after forming the paste layer, but before applying the liquid material, it is possible to control the wettability and the permeability of the paste layer and the liquid material by selecting a gas species corresponding to the object, and performing the discharge treatment. Moreover, the interface between the paste layer and the cured liquid material can be adjusted. This makes it possible to improve the accuracy and the strength of the resulting object.

When the discharge treatment is performed at a timing after applying the liquid material, but before curing the liquid material, a thin solid film is formed on the surface of the liquid material due to radicals generated by the discharge treatment, and it is expected that a pinning effect on the liquid material is achieved. Moreover, a paste layer formed after curing the liquid material easily becomes uniform. When the liquid material is a radiation-curable material, inhibition of polymerization on the surface of the liquid material due to oxygen can be reduced, and the radiation-curability of the liquid material is improved. This makes it possible to improve the accuracy and the strength of the resulting object.

When the discharge treatment is performed at a timing after curing the liquid material, but before starting forming the next unit layer, a paste layer is formed with improved applicability (coatability) after curing the liquid material, and a uniform thickness distribution is easily achieved. Moreover, an anchor effect is achieved by moderately roughening the cured liquid material (interface) using the discharge treatment, and the reactivity with the liquid material to be stacked is improved by forming the upper layer after breaking the polymer bonds on the surface of the liquid material. This makes it possible to improve the accuracy and the strength of the resulting object.

Application Example 6

In the method for producing an object as defined in Application Example 4 or 5, the applying of the liquid material may include discharging the liquid material using an inkjet method.

According to Application Example 6, it is possible to produce a high-resolution object at high speed. It is also possible to color the object, or adjust the hardness and the texture of the object by utilizing (combining) an ink that includes a pigment, or an ink having different elasticity.

Application Example 7

The method for producing an object as defined in Application Example 1 may include:
applying a liquid material that includes the resin material using an inkjet method, and curing the liquid material by applying energy to the liquid material to form the unit layer; and
performing the discharge treatment at either or both of a timing after applying the liquid material, but before curing the liquid material, and a timing after curing the liquid material, but before starting forming the next unit layer.

When the discharge treatment is performed at a timing after applying the liquid material, but before curing the liquid material, a thin solid film is formed on the surface of the liquid material due to radicals generated by the discharge treatment, and it is expected that a pinning effect on the liquid material is achieved. Moreover, an ink layer formed after curing the liquid material easily becomes uniform. When the liquid material is a radiation-curable material, inhibition due to oxygen can be reduced, and the radiation-curability of the liquid material is improved. This makes it possible to improve the accuracy and the strength of the resulting object.

When the discharge treatment is performed at a timing after curing the liquid material, but before starting forming the next unit layer, an ink layer is formed with improved applicability (coatability) after curing the liquid material, and a uniform thickness distribution is easily achieved. Moreover, an anchor effect is achieved by moderately roughening the cured liquid material (interface) using the discharge treatment, and the reactivity with the liquid material to be stacked is improved by forming the upper layer after breaking the polymer bonds on the surface of the liquid material. This makes it possible to improve the accuracy and the strength of the resulting object.

Application Example 8

In the method for producing an object as defined in any one of Application Examples 1 to 7, the discharge treatment may be performed in an atmosphere that includes an inert gas.

When the gas mainly includes helium or argon that ensures a high discharge efficiency, the discharge treatment can be stabilized, and performed at a low temperature. This makes it possible to reduce thermal damage to the resin material and the cured unit layer. When the gas mainly includes nitrogen, the reactivity with the resin material to be stacked is improved since the polymer bonds on the surface of the resin material are physically broken by the discharge treatment.

Application Example 9

In the method for producing an object as defined in any one of Application Examples 1 to 7, the discharge treatment may be performed in an atmosphere that includes oxygen.

According to Application Example 9, a capillary phenomenon is achieved by moderately roughening the interface between the unit layers, and a hydroxyl group can be provided to the interface between the unit layers. This makes it possible to improve wettability at the interface between the unit layers, and improve the processing accuracy.

Application Example 10

In the method for producing an object as defined in any one of Application Examples 1 to 7, the discharge treatment may be performed in an atmosphere that includes fluorine.

This makes it possible to provide liquid repellency, reduce wettability at the interface between the unit layers, and improve the processing accuracy.

Exemplary embodiments of the invention are described in detail below with reference to the drawings. Note that the following exemplary embodiments do not unduly limit the scope of the invention recited in the claims. Note also that all of the elements described in connection with the following exemplary embodiments should not necessarily be taken as essential elements of the invention.

Each direction used herein is defined as described below. Specifically, three spatial axes that are orthogonal to each other are referred to as "X-axis", "Y-axis", and "Z-axis", respectively. The term "vertical direction" refers to a direction (Z-direction) along the Z-axis. The downward vertical direction is referred to as "−Z-direction", and the upward vertical direction is referred to as "+Z-direction". A plane that is perpendicular to the Z-axis is referred to as "XY plane".

1. Method for Producing Object

A method for producing an object according to several embodiments of the invention includes forming and laying N unit layers into which an object is divided, sequentially from a first layer to an Nth layer, using a resin material as a material, or using a resin material for implementing a step, to form the object, the method including performing a discharge treatment at either or both of a timing while forming the unit layer, and a timing after forming the unit layer, but before starting forming the next unit layer.

The basic steps for producing a three-dimensional object are described below. FIG. 1 is a flowchart illustrating an example of the method for producing an object according to several embodiments of the invention. As illustrated in FIG. 1, the method for producing an object includes a three-dimensional data preparation step (S101), a slice data generation step (S102), and a modeling step (S103).

In the three-dimensional data preparation step (S101), three-dimensional CAD data about the object that is modeled in the modeling step (S103) is prepared.

In the slice data generation step (S102), slice data corresponding to N layers are generated based on the three-dimensional CAD data prepared in the three-dimensional data preparation step. The term "slice data" refers to data that represents the object that is sliced by (N−1) planes parallel to the XY plane.

The modeling step (S103) includes a step that supplies a material (including at least a resin material) for forming the object, and a step that cures the material. In the modeling step (S103), the material is supplied and cured based on the slice data generated from the three-dimensional CAD data to form a first layer, and the material is supplied and cured over the first layer to form a second layer. This step is repeated until an Nth layer is formed to complete the object.

Note that each of the first to Nth layers is referred to as "unit layer".

The method for producing an object according to several embodiments of the invention is characterized in that the discharge treatment is performed at either or both of a timing while forming the unit layer, and a timing after forming the unit layer, but before starting forming the next unit layer. It is possible to improve the affinity of the resin material to another material, adjust the interfacial state, or improve the bondability or the reactivity of the resin material, by changing the state of the interface between the unit layers using the discharge treatment. This makes it possible to improve the accuracy and the strength of the resulting object.

The method for producing an object according to several embodiments of the invention is described in detail below.

1.1. First Embodiment

A first embodiment illustrates a method for producing an object that utilizes fused deposition modeling. The term "fused deposition modeling" refers to a method that repeats a step that supplies and cures a molten resin material in a layer to produce an object. The resin material used in connection with the first embodiment, the configuration of the three-dimensional modeling device, and the method for producing an object according to the first embodiment are described below.

1.1.1. Resin Material

Examples of the resin material used in connection with the first embodiment include a thermoplastic resin. Examples of the thermoplastic resin include an acrylonitrile-butadiene-styrene copolymer (ABS) resin, a polycarbonate (PC) resin, a PC/ABS alloy, a PPSF/PPSU resin, a polyetherimide resin, resins obtained by modifying these resins, and the like.

The resin material used in connection with the first embodiment may have an arbitrary shape. It is preferable that the resin material be formed in the shape of a wire since the resin material can be easily supplied. The resin material is provided in a wound state (e.g., coil-like state), for example.

1.1.2. Device Configuration

Figure 2:
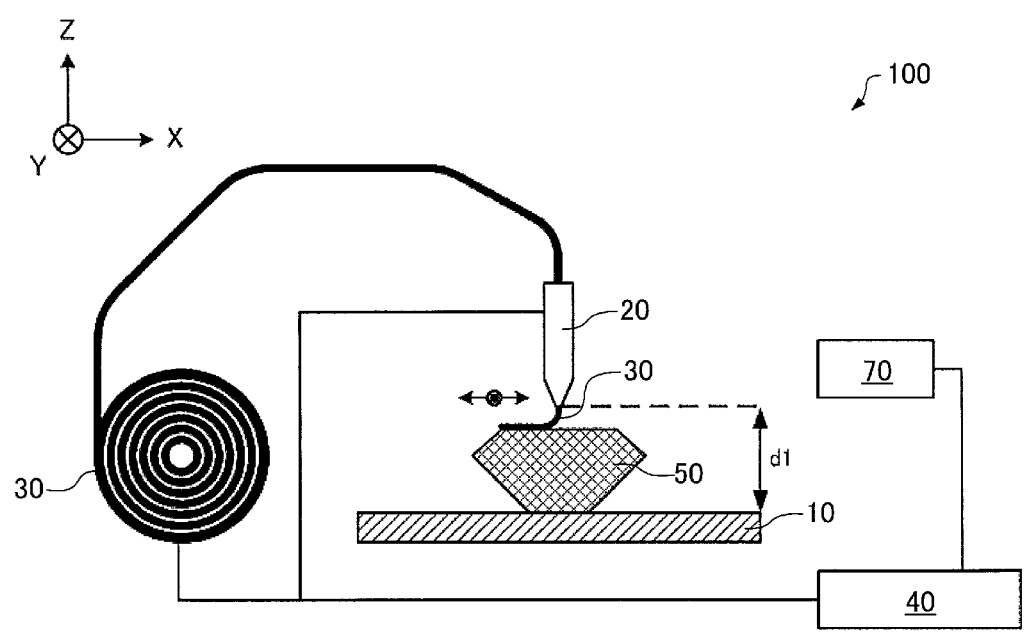
FIG. 2 is a diagram schematically illustrating an outline of the three-dimensional modeling device used in the first embodiment.

FIG. 2 is a diagram schematically illustrating an outline of the three-dimensional modeling device used in the first embodiment. As illustrated in FIG. 2, a three-dimensional modeling device 100 includes a stage 10 for modeling a three-dimensional object, and a nozzle 20 that melts a resin material 30, and discharges the molten resin material 30 toward the stage 10.

The stage 10 is a work plane for modeling a three-dimensional object. The upper side of the stage 10 is parallel to the XY plane. The stage 10 is configured so that the height of the stage 10 can be adjusted along the Z-axis.

The nozzle 20 has an opening (not illustrated in FIG. 2) for discharging the molten resin material 30 toward the stage 10. The nozzle 20 is provided so that the opening extends almost vertically (+Z-direction) with respect to the stage 10. The nozzle 20 is provided with a heating mechanism (not illustrated in FIG. 2) for melting the resin material 30. The heating mechanism heats the resin material 30 to a temperature equal to or higher than the glass transition temperature (Tg) to melt the resin material 30 so that the resin material 30 has the desired fluidity. This makes it possible to supply the resin material 30 from the nozzle 20.

The nozzle 20 is moved along the XY plane. The unit layer having the desired shape based on the slice data can be formed by supplying the resin material 30 to a given position while moving the nozzle 20. The three-dimensional modeling device 100 according to the first embodiment may be configured so that the stage 10 is moved along the XY plane instead of moving the nozzle 20 along the XY plane.

The stage 10 is moved in the −Z-direction. The stage 10 is moved in the −Z-direction by the thickness $\Delta d$ (FIG. 7) of the unit layer after forming the unit layer, but before starting forming the next unit layer. Therefore, the distance between the nozzle 20 and an uncompleted object 50 in the Z-axis direction can always be maintained constant during the unit layer-forming process. The three-dimensional modeling device 100 according to the first embodiment may be configured so that the nozzle 20 is moved in the −Z-direction instead of moving the stage 10 in the −Z-direction.

The resin material 30 is supplied to the nozzle 20 using a supply mechanism (not illustrated in FIG. 2). The supply mechanism supplies the resin material 30 that is formed in the shape of a wire to the nozzle 20. The supply mechanism is not limited as long as the supply mechanism can supply the resin material 30 to the nozzle 20. For example, the supply mechanism may be a mechanism that holds the resin material 30 using a driving roller and an idle roller, and advances the resin material 30 by applying a rotational force to the driving roller.

The three-dimensional modeling device 100 includes a control section 40 that controls each mechanism based on the slice data. The nozzle 20, the supply mechanism, and a plasma irradiation mechanism 70 (described later) are controlled by the control section 40. The control section 40 causes the supply mechanism to supply the resin material 30 to the nozzle 20, and causes the nozzle 20 to discharge the molten resin material 30 toward the stage 10 while moving the nozzle 20 in the X-direction and the Y-direction. The control section 40 causes (drives) the plasma irradiation mechanism 70 to apply plasma at a given timing (described later). The control section 40 moves the stage 10 in the −Z-direction by the thickness $\Delta d$ (FIG. 7) of the unit layer after forming the unit layer, but before starting forming the next unit layer. The object corresponding to the three-dimensional CAD data can be produced by layering the unit layers by repeating the above operation.

The three-dimensional modeling device 100 includes the plasma irradiation mechanism 70. The plasma irradiation mechanism 70 applies plasma to the surface of the unit layer.

The plasma irradiation mechanism 70 includes a plasma generation section 71 (FIG. 3) that includes a plasma generation mechanism, and a gas storage section (not illustrated in the drawings) that stores gas that is supplied to the plasma generation section, for example. In the first embodiment, the plasma irradiation mechanism 70 is incorporated in the three-dimensional modeling device 100. Note that a plasma irradiation mechanism may be provided independently of the three-dimensional modeling device 100. A plasma irradiation mechanism that is provided independently of the three-dimensional modeling device 100 may be connected to the control section 40, and controlled by the control section 40.

Figure 3:
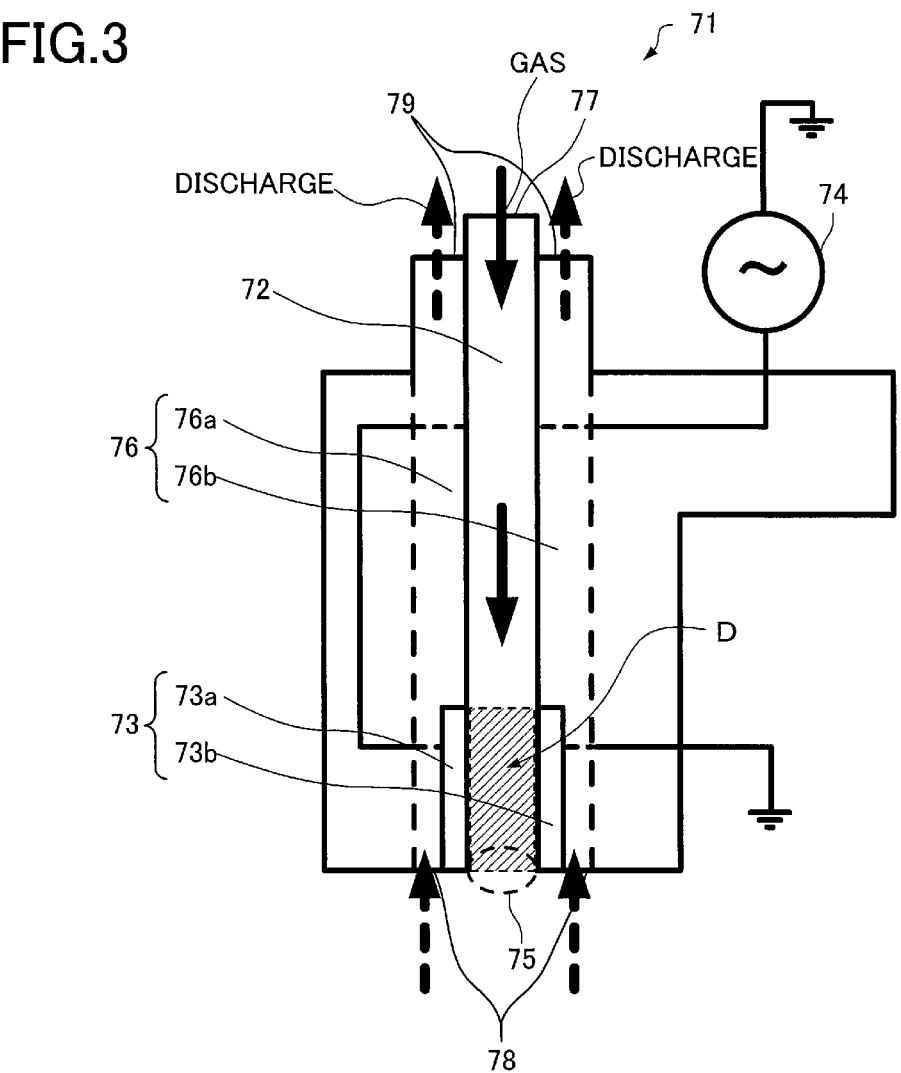
FIG. 3 is a diagram schematically illustrating the cross section of the plasma generation section included in the plasma irradiation mechanism.

FIG. 3 is a diagram schematically illustrating the cross section (along the ZX plane) of the plasma generation section 71 included in the plasma irradiation mechanism 70.

As illustrated in FIG. 3, the plasma generation section 71 includes a gas chamber 72. A gas inlet 77 is provided at one end of the gas chamber 72. The gas inlet 77 is connected to the gas storage section (not illustrated in FIG. 3) through a gas supply tube (not illustrated in FIG. 3). A plasma irradiation nozzle 75 is provided at the other end of the gas chamber 72. The plasma irradiation nozzle 75 is provided to face the stage 10 (see FIG. 6). Gas is supplied to the gas chamber 72 in the direction from the gas inlet 77 to the plasma irradiation nozzle 75. Specifically, a gas stream that flows from the gas inlet 77 on the upstream side toward the plasma irradiation nozzle 75 on the downstream side is formed inside the gas chamber 72.

An electrode pair 73 is provided around the other end of the gas chamber 72 (at a position close to the plasma irradiation nozzle 75). The electrode pair 73 includes a first electrode 73a that is provided in the −X-axis direction with respect to the gas chamber 72, and a second electrode 73b that is provided in the +X-axis direction with respect to the gas chamber 72. The electrode 73a and the electrode 73b are connected to a power supply 74.

When a voltage is applied between the electrode 73a and the electrode 73b from the power supply 74, an electric discharge occurs between the electrode 73a and the electrode 73b (discharge section D). Gas plasma is generated when gas is supplied to the gas chamber 72, and passed through the space between the electrode 73a and the electrode 73b in a state in which an electric discharge occurs between the electrode 73a and the electrode 73b. Specifically, plasma is generated by at least part of the gas. The plasma thus generated is applied to the surface of the unit layer from the plasma irradiation nozzle 75. The discharge section D does not come in contact with the surface of the unit layer. A system in which the discharge section D does not come in contact with the plasma irradiation target is referred to as "remote jet system". A system in which the discharge section D comes in contact with the plasma irradiation target is referred to as "direct system". The modeling devices according to the first to fifth embodiments include a plasma irradiation mechanism that utilizes the remote jet system. Note that the modeling device may include a plasma irradiation mechanism that utilizes the direct system.

The distance between the plasma irradiation nozzle 75 and the unit layer is not particularly limited as long as the generated plasma can be applied to the unit layer. For example, the distance between the plasma irradiation nozzle 75 and the unit layer may be set to 0.5 to 10 mm.

The amount of power supplied when generating plasma is not particularly limited as long as plasma can be generated from the supplied gas. For example, the amount of power supplied when generating plasma may be set to 100 to 200 Wh.

The frequency of the power supply 74 when generating plasma is not particularly limited as long as plasma can be generated from the supplied gas. For example, the frequency of the power supply 74 may be set to 50 kHz to 2.45 Ghz.

The gas supplied to the gas chamber 72 is selected taking account of the object of the plasma treatment (i.e., the way or the degree of surface modification by plasma irradiation). The gas supplied to the gas chamber 72 may be a single gas that consists of one type of gas, or may be a mixed gas obtained by mixing two or more types of gas. Examples of the gas include gas that includes oxygen ($O_2$), air (including at least nitrogen ($N_2$) and oxygen ($O_2$)), water vapor ($H_2O$), nitrous oxide ($N_2O$), ammonia ($NH_3$), or a fluorine atom (F), an inert gas such as argon (Ar), helium (He), neon (Ne), and nitrogen ($N_2$), and the like.

It is possible to stabilize the supply of plasma, and generate plasma at a low temperature by performing the plasma treatment in an atmosphere that includes an inert gas. This makes it possible to reduce thermal damage to the resin material 30.

A hydroxyl group is provided to the surface of the unit layer when the plasma treatment is performed in an atmosphere that includes oxygen. This makes it possible to improve the wettability of the surface of the unit layer, and improve the processing accuracy of the object 50 by controlling the wettability of the surface of the unit layer.

The surface of the unit layer is provided with liquid repellency when the plasma treatment is performed in an atmosphere that includes fluorine. This makes it possible to reduce the wettability of the surface of the unit layer, and improve the processing accuracy of the object 50 by controlling the wettability of the surface of the unit layer.

The flow rate of the gas supplied to the gas chamber 72 is not particularly limited, and may be appropriately set taking account of the capacity of the gas chamber 72, the type of the gas, the type of the resin material 30, the modeling speed, and the like.

The plasma irradiation mechanism 70 illustrated in FIG. 3 further includes an exhaust tube 76 that sucks excess gas situated around the plasma irradiation nozzle 75, and discharges the excess gas at a position away from the plasma irradiation nozzle 75. In the example illustrated in FIG. 3, the exhaust tube 76 includes a first exhaust tube 76a that is provided along the gas chamber 72 in the −X-axis direction with respect to the gas chamber 72, and a second exhaust tube 76b that is provided along the gas chamber 72 in the +X-axis direction with respect to the gas chamber 72. An inlet 78 is provided at one end of the exhaust tube 76, and an outlet 79 is provided at the other end of the exhaust tube 76. The inlet 78 is provided at a position close to the plasma irradiation nozzle 75, and the outlet 79 is provided at a position away from the plasma irradiation nozzle 75. It is possible to appropriately adjust the irradiation range of plasma applied from the plasma irradiation nozzle 75, and locally treat the desired range of the unit layer by applying plasma while sucking and discharging excess gas through the exhaust tube 76. The installation position of the exhaust tube 76 is not limited to the position illustrated in FIG. 3 as long as excess gas can be appropriately sucked and discharged.

Figure 4:
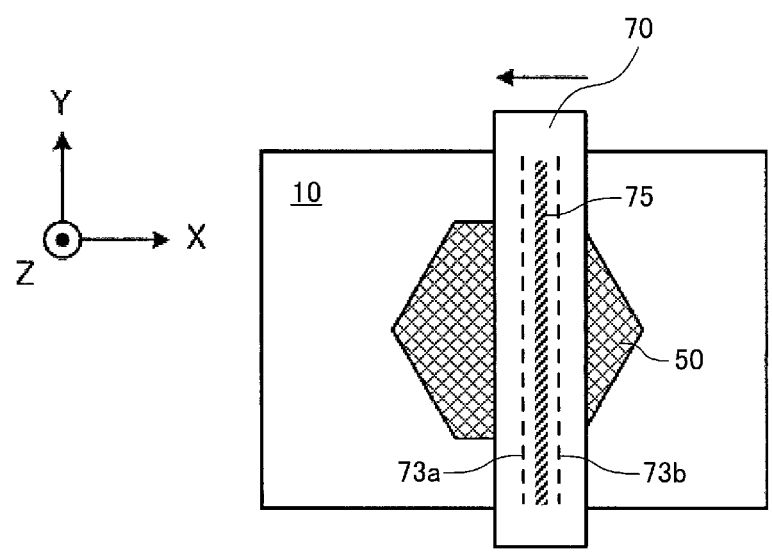
FIG. 4 is a plan view schematically illustrating a state in which the plasma irradiation mechanism applies plasma to the unit layer in the first embodiment.

FIG. 4 is a plan view schematically illustrating a state in which the plasma irradiation mechanism 70 applies plasma to the surface of the unit layer while modeling the object 50.

The plasma irradiation mechanism 70 includes a linear plasma irradiation section 75 that extends in the Y-axis direction between the plate-like electrodes 73a and 73b. The length of the plasma irradiation section 75 in the Y-axis direction is set so that the entirety of the object 50 that is modeled on the stage 10 can be covered by the plasma irradiation section 75 in the Y-axis direction. The plasma irradiation mechanism 70 is scanned in the X-axis direction so that the plasma irradiation section 75 can cover the entirety of the object 50 in the X-axis direction. In the example illustrated in FIG. 4, the plasma irradiation mechanism 70 includes the plasma irradiation section 75 that extends in the Y-axis direction, and is scanned in the X-axis direction. Note that a plasma irradiation mechanism that includes a plasma irradiation section that extends in the X-axis direction, and is scanned in the Y-axis direction, may be used instead of the plasma irradiation mechanism 70. The plasma irradiation mechanism 70 illustrated in FIG. 4 includes a single plasma irradiation mechanism. Note that the plasma irradiation mechanism 70 may include a plurality of plasma irradiation mechanisms arranged in rows. The plasma irradiation mechanism is classified into a linear plasma irradiation mechanism that includes the linear plasma irradiation section 75 (see FIG. 4), and is scanned in one direction, and a serial plasma irradiation mechanism that includes a spot-like plasma irradiation section, and is scanned in the X-axis direction and the Y-axis direction. The modeling devices according to the first to fifth embodiments include the linear plasma irradiation mechanism. Note that the modeling device may include the serial plasma irradiation mechanism.

The plasma irradiation mechanism 70 included in the three-dimensional modeling device 100 according to the first embodiment is an atmospheric pressure plasma irradiation mechanism that generates and applies plasma under atmospheric pressure. The modeling devices according to the second to fifth embodiments described later also include the atmospheric pressure plasma irradiation mechanism. Note that the modeling devices according to the first to fifth embodiments may include a reduced pressure plasma irradiation mechanism that generates and applies plasma under reduced pressure, or a vacuum plasma irradiation mechanism that generates and applies plasma under vacuum, instead of the atmospheric pressure plasma irradiation mechanism. A reduced pressure plasma treatment is performed under reduced pressure, and a vacuum plasma treatment is performed under vacuum. Therefore, when using the reduced pressure plasma irradiation mechanism or the vacuum plasma irradiation mechanism, it is necessary to additionally provide a chamber that receives at least the uncompleted object 50 when applying plasma, and a decompression device that decompresses the chamber. Specifically, the size of the modeling device tends to be increased when using the reduced pressure plasma irradiation mechanism or the vacuum plasma irradiation mechanism. On the other hand, it is unnecessary to provide such a chamber and decompression device when using the atmospheric pressure plasma irradiation mechanism, and the size of the device can be reduced. It is also possible to implement a series of steps (i.e., material supply step, unit layer-forming step, and plasma irradiation step) for producing an object using a single production device.

1.1.3. Method for Producing Object

Figure 5:
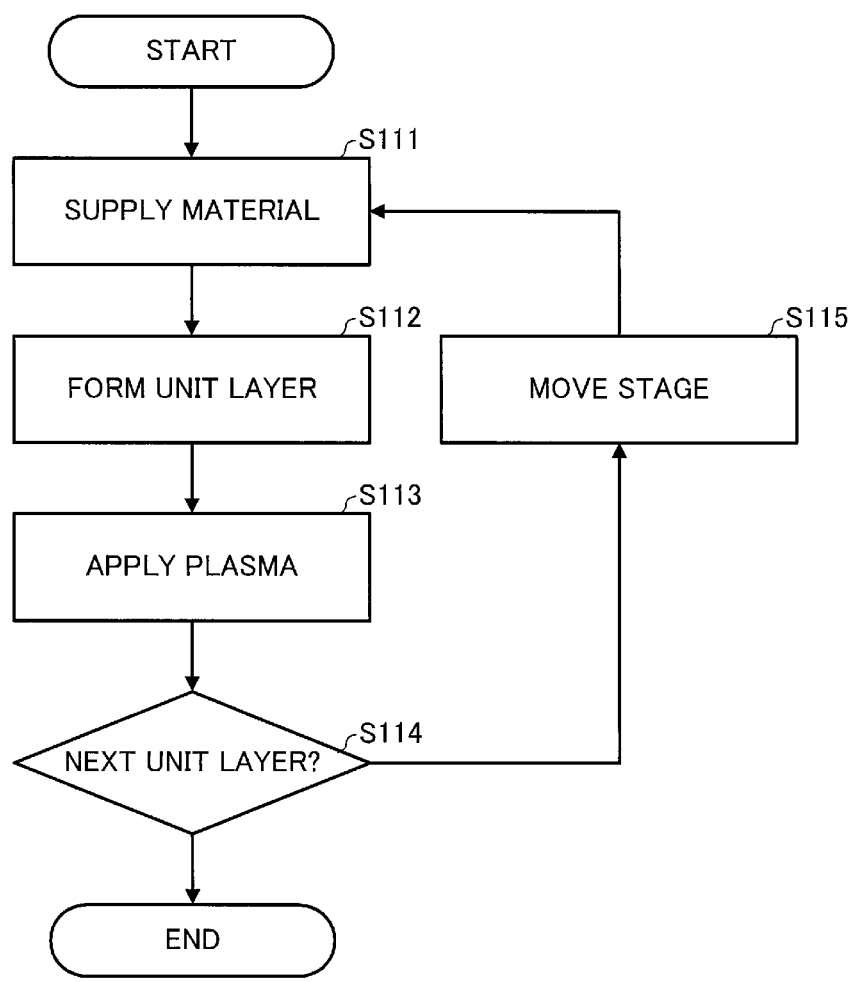
FIG. 5 is a flowchart illustrating an example of the modeling step in the method for producing an object according to the first embodiment.
Figure 6:
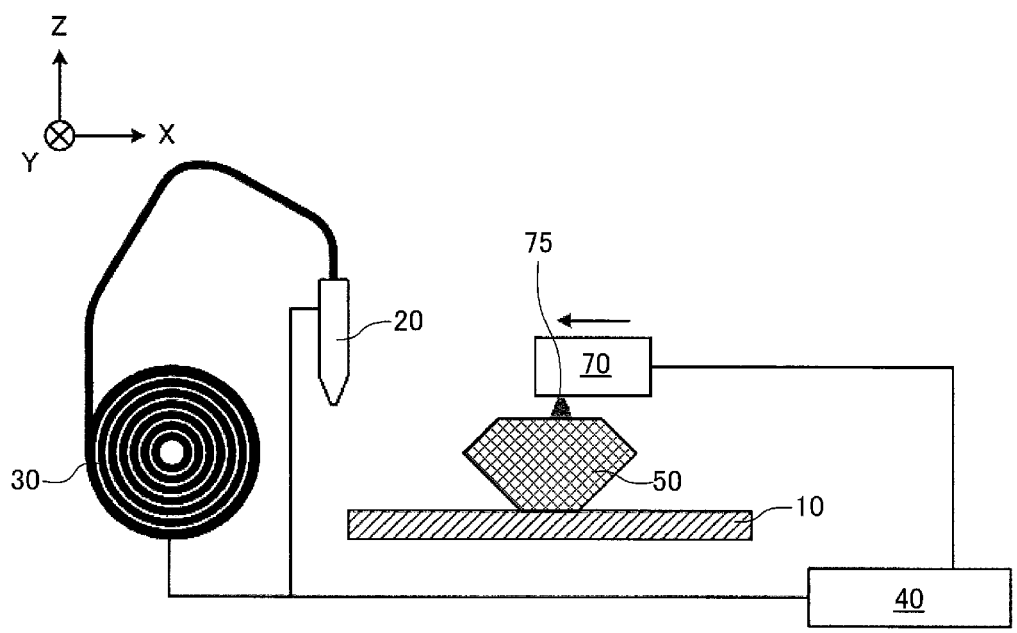
FIG. 6 is a diagram schematically illustrating the plasma irradiation step according to the first embodiment.
Figure 7:
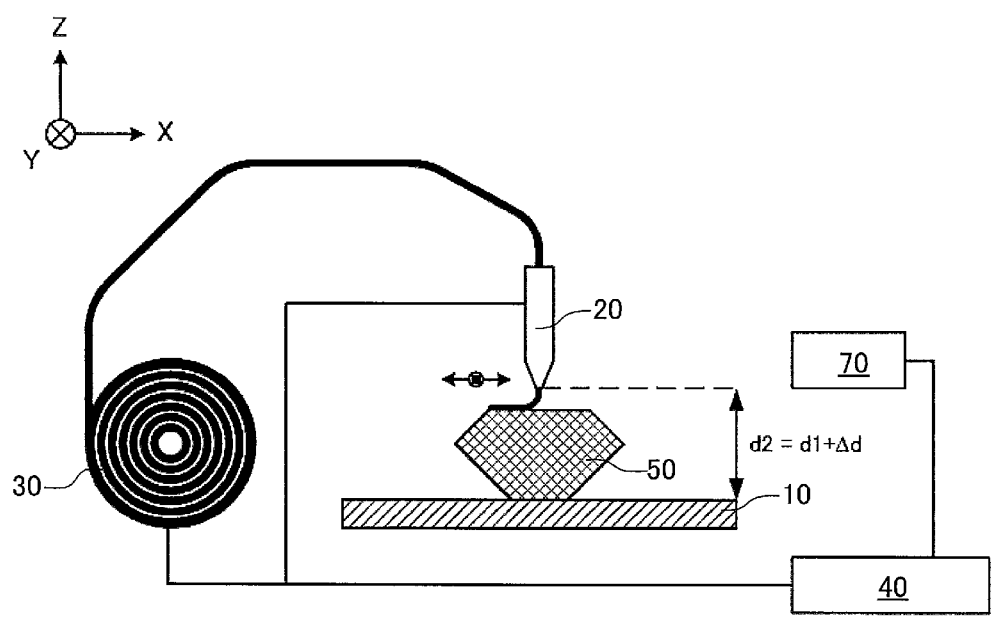
FIG. 7 is a diagram schematically illustrating the moving step according to the first embodiment.

FIG. 5 is a flowchart illustrating an example of the modeling step in the method for producing an object according to the first embodiment. FIG. 6 is a diagram schematically illustrating the plasma irradiation step according to the first embodiment. FIG. 7 is a diagram schematically illustrating a moving step according to the first embodiment.

As illustrated in FIG. 1, the method for producing an object according to the first embodiment includes the three-dimensional data preparation step (S101), the slice data generation step (S102), and the modeling step (S103). The three-dimensional data preparation step (S101) and the slice data generation step (S102) are performed in the same manner as described above, and description thereof is omitted.

As illustrated in FIG. 5, the modeling step (S103) includes a material supply step (S111), a unit layer-forming step (S112), a plasma irradiation step (S113), a next layer presence/absence determination step (S114), and a moving step (S115). An object can be completed by repeating these steps. The steps are repeated corresponding to the number of pieces of slice data.

In the material supply step (S111), the molten resin material 30 is supplied to the stage 10. More specifically, the resin material 30 that is formed in the shape of a wire is supplied to the upper end of the nozzle 20. The resin material 30 is heated to a temperature equal to or higher than the glass transition temperature (Tg) using the heating mechanism provided inside the nozzle 20 to melt the resin material 30. The molten resin material 30 is supplied toward the upper side of the stage 10 from the opening provided at the lower end of the nozzle 20. Note that the molten resin material 30 is supplied so that the molten resin material 30 is slowly placed on the upper side of the stage 10 as if to squeeze toothpaste out of a tube, and place the toothpaste on a toothbrush.

In the unit layer-forming step (S112), the unit layer is formed using the molten resin material 30. More specifically, the unit layer is formed using the molten resin material 30 in a single stroke while moving the nozzle 20 in the X-direction and the Y-direction. The nozzle 20 supplies the molten resin material 30 so that the desired shape corresponding to the slice data is formed. Since the resin material 30 is a thermoplastic resin, the resin material 30 solidifies when the temperature of the resin material 30 has become equal to or lower than the glass transition temperature. Note that the speed at which the resin material 30 solidifies may be increased by cooling the resin material 30. The unit layer is formed in this manner. Note that the distance between the upper side of the stage 10 and the opening of the nozzle 20 in the Z-axis direction when the unit layer is formed is referred to as d1 (see FIG. 2).

In the plasma irradiation step (S113), plasma is applied to the unit layer using the plasma irradiation mechanism 70 (see FIG. 6). The surface of the unit layer is modified by plasma irradiation. The details of the surface modification effects are described later.

In the next layer presence/absence determination step (S114), whether or not it is necessary to form the next unit layer is determined when the unit layer has been formed. When it is unnecessary to form the next unit layer, the desired three-dimensional object has been completed.

When it is necessary to form the next unit layer, the moving step (S115) is performed. In the moving step (S115), the stage 10 is moved in the −Z-direction by the thickness (Δd) of the unit layer (see FIG. 7). Note that the nozzle 20 may be moved in the +Z-direction by the thickness (Δd) of the unit layer instead of moving the stage 10 in the −Z-direction. The distance d2 between the upper side of the stage 10 and the opening of the nozzle 20 in the Z-axis direction becomes d2=d1+Δd by performing the moving step (S115). Therefore, the distance between the nozzle 20 and the uncompleted object 50 in the Z-axis direction can always be maintained constant during the unit layer-forming process.

When the nozzle 20 is moved in the +Z-direction by the thickness (Δd) of the unit layer in the moving step (S115), the plasma irradiation mechanism 70 is also moved in the +Z-direction by the thickness (Δd) of the unit layer. When the stage 10 is moved in the −Z-direction by the thickness (Δd) of the unit layer, the plasma irradiation mechanism 70 is not moved in the Z-direction. Therefore, the distance between the plasma irradiation mechanism 70 and the uncompleted object 50 in the Z-axis direction can always be maintained constant during the unit layer-forming process.

As described above, the three-dimensional modeling device 100 according to the first embodiment includes the plasma irradiation mechanism 70. The method for producing an object according to the first embodiment includes the plasma irradiation step (S113). The state and the properties of the surface of the unit layer can be changed by applying plasma to the surface of the unit layer using the plasma irradiation mechanism 70. For example, an anchor effect (that is achieved by moderately roughening the surface of the unit layer), or an effect that breaks the polymer bonds on the surface of the unit layer can be implemented by the plasma treatment. The interfacial strength (adhesion) between the unit layers can be improved by providing the resin material for forming the next unit layer to the unit layer of which the surface has been modified. It is possible to control wettability at the interface between the unit layers, and improve the processing accuracy by selecting a gas species corresponding to the object, and performing the discharge treatment. This makes it possible to improve the accuracy and the strength of the resulting object.

In the first embodiment, the plasma irradiation step (S113) is performed immediately after the unit layer has been formed (immediately after the step S112). Note that the plasma irradiation step (S113) may be performed at another timing. For example, the plasma irradiation step (S113) may be performed between the step S114 and the step S115, or may be performed between the step S115 and the step S111. Specifically, the plasma treatment may be performed after forming the unit layer (after performing the step S112 that forms the nth layer), but before starting forming the next unit layer (before starting the step S111 that forms the (n+1)th layer). The plasma irradiation step (S113) may be performed during a unit layer-forming process (during the step S112 that forms the nth layer). Specifically, the plasma irradiation step (S113) is performed at either or both of a timing after forming the unit layer (after performing the step S112 that forms the nth layer), but before starting forming the next unit layer (before starting the step S111 that forms the (n+1)th layer), and a timing while forming the unit layer (during the step S112 that forms the nth layer).

Although the plasma treatment (plasma irradiation) has been described above as an example of the discharge treatment, a corona discharge mechanism may be used instead of the plasma irradiation mechanism. Specifically, the discharge treatment is not limited to the plasma treatment (plasma irradiation), but may be a corona discharge treatment. The corona discharge mechanism disclosed in JP-A-2010-241999, JP-A-2005-235448, or JP-A-2003-300029 may be used as the corona discharge mechanism. Specifically, the corona discharge mechanism may have a mechanism similar to the remote jet mechanism. For example, the corona discharge mechanism may be configured so that a pair of discharge electrodes is placed at the center and the outer periphery of a gas passage, a corona discharge is generated by introducing gas into the gas passage, and applying a high voltage between the pair of discharge electrodes, and a gas stream generated by the corona discharge is sprayed onto the unit layer. This also applies to the second to fifth embodiments described below.

1.2. Second Embodiment

The second embodiment illustrates a method for producing an object that utilizes powder curing. The term "powder curing" refers to a method that repeats a step that supplies and selectively cures a powdered resin in a layer to produce an object. The resin material used in connection with the second embodiment, the configuration of the three-dimensional modeling device, and the method for producing an object according to the second embodiment are described below.

1.2.1. Resin Material

A known material may be used as the resin material. Examples of the resin material include a polycarbonate, polystyrene, poly(methyl methacrylate), a cycloolefin resin, an acrylic resin, a crystalline transparent resin, and the like.

The resin material used in connection with the second embodiment is a powdered resin material. The volume average particle size of the resin material is preferably 1 to 200 micrometers, more preferably 5 to 120 micrometers, and particularly preferably 10 to 100 micrometers, from the viewpoint of ensuring that the particles exhibit fluidity. The volume average particle size may be measured by using a device "Microtrac MT3300" manufactured by Nikkiso Co., Ltd.

1.2.2. Device Configuration

Figure 8:
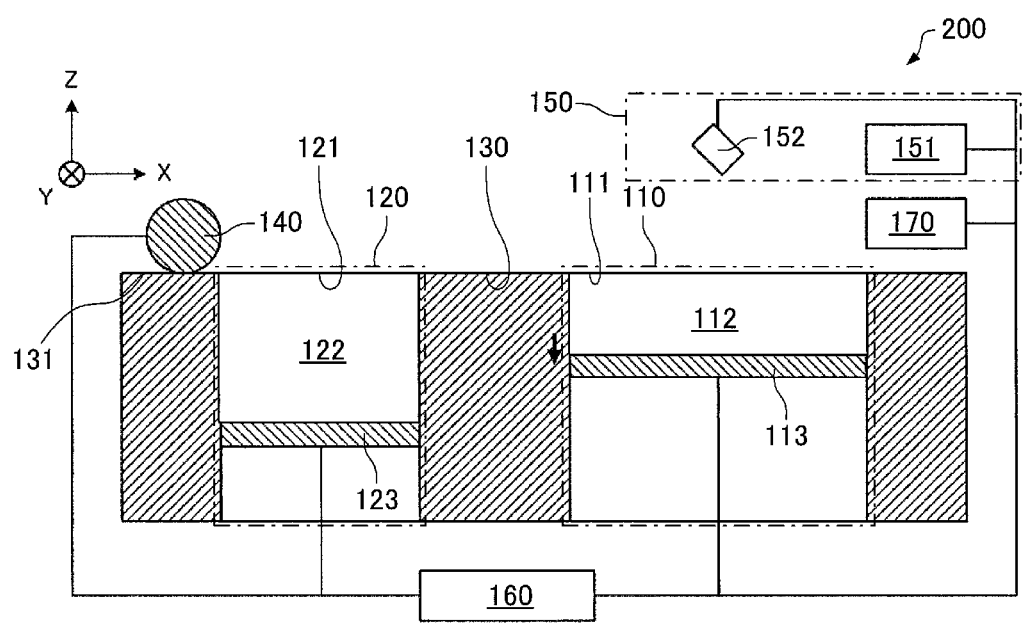
FIG. 8 is a diagram schematically illustrating an outline of the three-dimensional modeling device used in the second embodiment.

FIG. 8 is a diagram schematically illustrating an outline of the three-dimensional modeling device used in the second embodiment. As illustrated in FIG. 8, a three-dimensional modeling device 200 includes a processing section 110 for modeling a three-dimensional object, and a supply section 120 that supplies a powdered resin material (hereinafter may be referred to as "resin powder").

As illustrated in FIG. 8, the processing section 110 includes a pillar-like first space 112 and a stage 113. When the first space 112 is considered to be a geometrical pillar, the pillar has an upper side that extends along the XY plane, a bottom that extends along the XY plane, and a side that extends along the Z-axis direction. The first space 112 has an opening 111 that is parallel to the XY plane, and provided at the end of the first space 112 in the +Z-direction. The stage 113 is a work plane for modeling a three-dimensional object. The stage 113 is provided in the −Z-direction with respect to the first space 112. The upper side of the stage 113 is parallel to the XY plane. The stage 113 is configured to be movable within the first space 112 in the −Z-direction.

The supply section 120 includes a pillar-like second space 122 and a piston 123. When the second space 122 is considered to be a geometrical pillar, the pillar has an upper side that extends along the XY plane, a bottom that extends along the XY plane, and a side that extends along the Z-axis direction. The second space 122 has an opening 121 that is parallel to the XY plane, and provided at the end of the second space 122 in the +Z-direction. The piston 123 is provided in the −Z-direction with respect to the second space 122. The upper side of the piston 123 is parallel to the XY plane. The piston 123 is configured to be movable within the second space 122 in the +Z-direction. The resin powder is placed between the opening 121 and the upper side of the piston 123. The piston 123 pushes the resin powder upward in the +Z-direction at a given timing. The resin powder pushed by the piston 123 is slightly exposed from the second space 122 in the +Z-direction.

The three-dimensional modeling device 200 includes a connection surface 130 that connects the opening 111 of the first space 112 of the processing section 110 and the opening 121 of the second space 122 of the supply section 120, and a supply mechanism 140 that supplies the resin powder from the supply section 120 to the processing section 110.

The connection surface 130 is a surface that connects the opening 111 of the processing section 110 and the opening 121 of the supply section 120. The connection surface 130 is provided parallel to the XY plane. The connection surface 130 functions as a supply channel for transferring the resin powder (material) from the supply section 120 to the processing section 110.

The supply mechanism 140 supplies the resin powder from the supply section 120 to the processing section 110. The supply mechanism 140 is normally provided on a surface 131 that is opposite to the connection surface 130 with respect to the supply section 120 in a plane view. The surface 131 is provided parallel to the XY plane. The supply mechanism 140 is a roller that has a cylindrical shape, and extends along the Y-direction. The roller is moved parallel to the XY plane while rotating and coming in contact with the connection surface 130. The resin powder that is exposed from the second space 122 of the supply section 120 in the +Z-axis direction is supplied to the first space 112 of the processing section 110 by moving the roller from the supply section 120 to the processing section 110. The roller is returned to the original position after the resin powder has been supplied to the first space 112 of the processing section 110. It suffices that the supply mechanism 140 has a function of supplying the resin powder from the supply section 120 to the processing section 110. Therefore, the supply mechanism 140 may be implemented by a non-rotating mechanism such as a squeegee.

The three-dimensional modeling device 200 includes an energy irradiation mechanism 150 that selectively applies energy to the resin powder supplied to the processing section 110.

The energy irradiation mechanism 150 includes an energy source 151 that generates energy (e.g., light or heat), and a mirror 152 that applies the energy supplied from the energy source 151 to the opening 111 of the processing section 110. The energy source 151 is implemented by a laser, a UV source, a heater, or the like. The mirror 152 is provided with a mechanism that adjusts the energy irradiation angle, and scans the resin powder with the energy in the ±X-direction and the ±Y-direction. The energy irradiation angle is adjusted using the mirror 152 so that the desired shape based on the slice data is formed to selectively cure the resin powder. The resin powder may be cured using a method that utilizes the polymerization reaction of the resin powder, a method that melts and cools (cures) the resin powder, or the like.

The mirror 152 may be replaced by a line scan head that scans the resin powder with the energy in one direction, or a serial scan head that scans the resin powder with the energy in two directions. The line scan head or the serial scan head is moved along the XY plane. The line scan head or the serial scan head applies the energy to the resin powder supplied to the opening 111 of the processing section 110 while being moved. A surface-emitting energy irradiation means may be used as long as sufficient energy can be applied to the resin powder.

The three-dimensional modeling device 200 includes a control section 160 that controls each mechanism based on the slice data. The processing section 110, the supply section 120, the supply mechanism 140, and a plasma irradiation mechanism 170 (described later) are controlled by the control section 160. The control section 160 moves the piston 123 of the supply section 120 upward at a given timing so that the resin powder is slightly exposed in the +Z-direction. The control section 160 causes (drives) the supply mechanism 140 to supply the resin powder to the first space 112 of the processing section 110. The control section 160 causes the energy supplied from the energy source 151 to be applied to the opening 111 of the processing section 110 so that the desired shape corresponding to the slice data is formed. The control section 160 causes (drives) the plasma irradiation mechanism 170 to apply plasma at a given timing (described later). The control section 160 moves the stage 113 of the processing section 110 in the —Z-direction by the thickness of the unit layer after forming the unit layer, but before starting forming the next unit layer. The object corresponding to the three-dimensional CAD data can be produced by layering the unit layers by repeating the above operation.

The three-dimensional modeling device 200 includes the plasma irradiation mechanism 170. The plasma irradiation mechanism 170 applies plasma to the interface between the unit layers while being moved along the XY plane. The structure and the like (including the modifications) of the plasma irradiation mechanism 170 are the same as those of the plasma irradiation mechanism 70 described above in connection with the first embodiment, and description thereof is omitted. In the second embodiment, the plasma irradiation mechanism 170 is incorporated in the three-dimensional modeling device 200. Note that a plasma irradiation mechanism that is provided independently of the three-dimensional modeling device 200 may be connected to the control section 160, and driven by the control section 160.

1.2.3. Method for Producing Object

Figure 9:
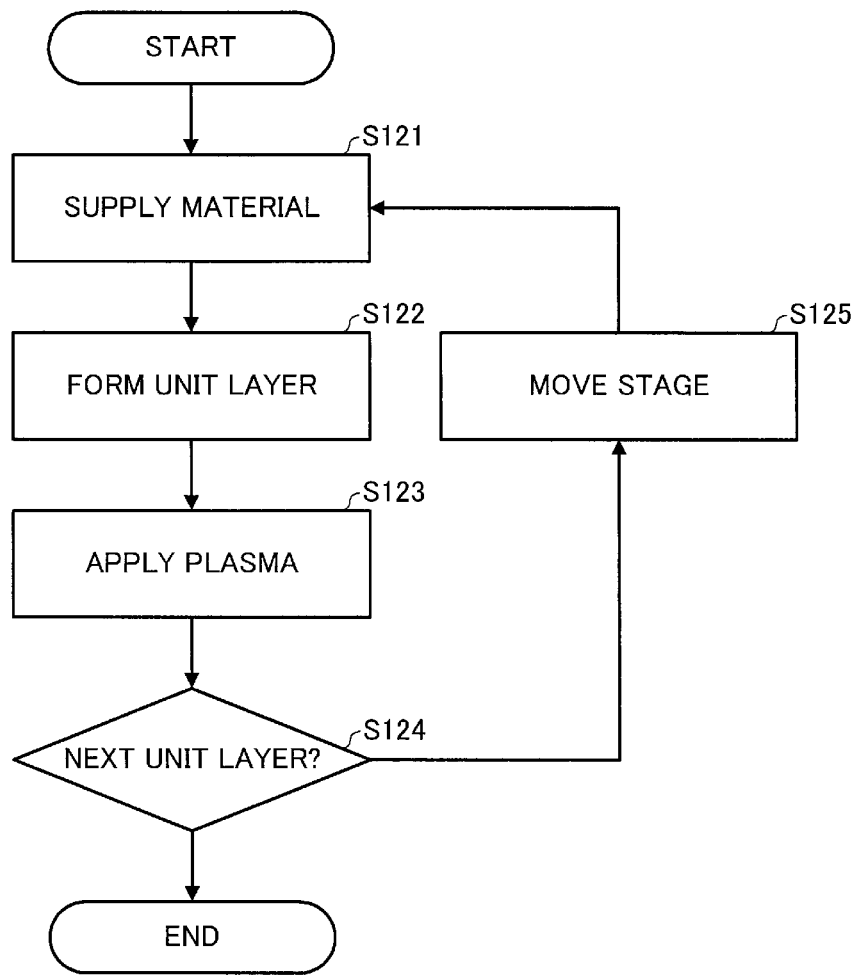
FIG. 9 is a flowchart illustrating an example of the modeling step in the method for producing an object according to the second embodiment.
Figure 10:
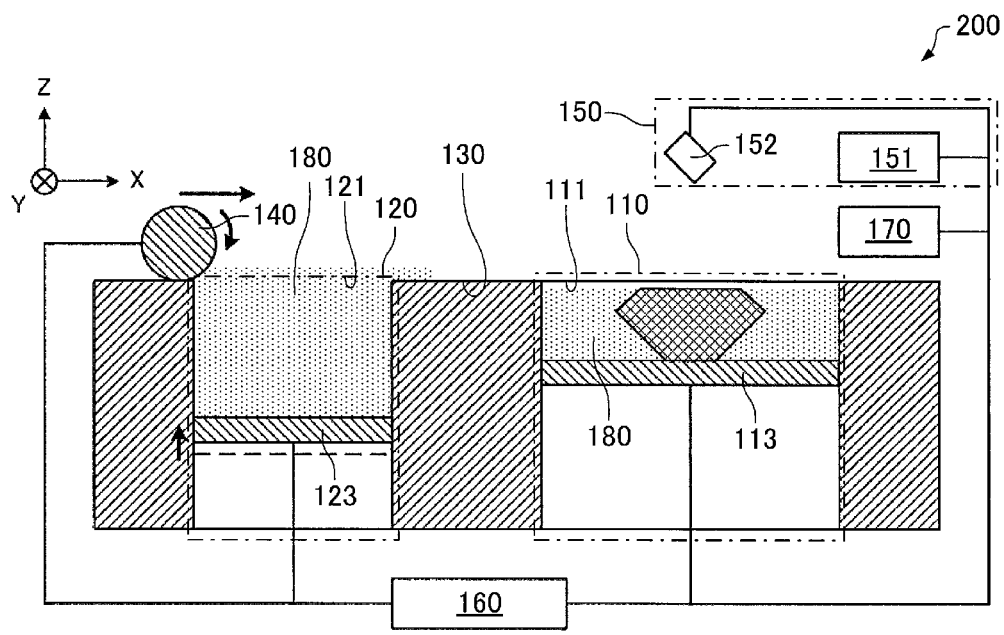
FIG. 10 is a diagram schematically illustrating the material supply step according to the second embodiment.
Figure 11:
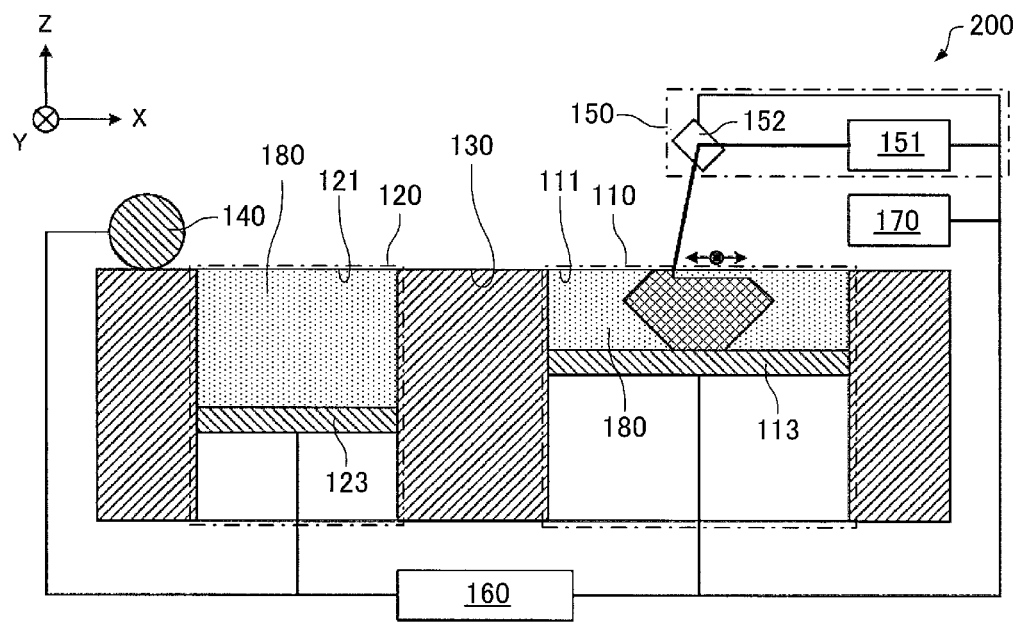
FIG. 11 is a diagram schematically illustrating the unit layer-forming step according to the second embodiment.
Figure 12:
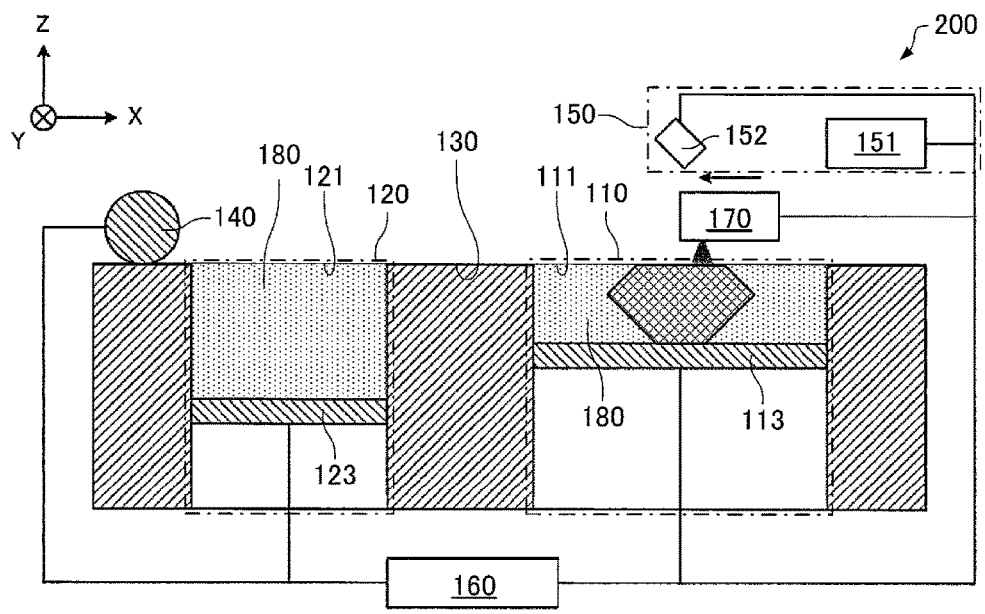
FIG. 12 is a diagram schematically illustrating the plasma irradiation step according to the second embodiment.

FIG. 9 is a flowchart illustrating an example of the modeling step in the method for producing an object according to the second embodiment. FIG. 10 is a diagram schematically illustrating the material supply step according to the second embodiment. FIG. 11 is a diagram schematically illustrating the unit layer-forming step according to the second embodiment. FIG. 12 is a diagram schematically illustrating the plasma irradiation step according to the second embodiment.

As illustrated in FIG. 1, the method for producing an object according to the second embodiment includes the three-dimensional data preparation step (S101), the slice data generation step (S102), and the modeling step (S103). The three-dimensional data preparation step (S101) and the slice data generation step (S102) are performed in the same manner as described above, and description thereof is omitted.

As illustrated in FIG. 9, the modeling step (S103) includes a material supply step (S121), a unit layer-forming step (S122), a plasma irradiation step (S123), a next layer presence/absence determination step (S124), and a moving step (S125). An object can be completed by repeating these steps. The steps are repeated corresponding to the number of pieces of slice data.

In the material supply step (S121), the resin material (resin powder 180) is supplied to the stage 113. As illustrated in FIG. 10, the piston 123 of the supply section 120 is moved upward in the +Z-direction. The resin powder 180 is thus exposed from the opening 121. The resin powder 180 exposed from the opening 121 is transferred to the processing section 110 by driving the supply mechanism 140 so as to push the resin powder 180. When forming the first layer, the stage 113 of the processing section 110 is positioned slightly in the −Z-direction with respect to the connection surface 130. Therefore, the resin powder is deposited on the stage 113 of the processing section 110 to a given thickness.

In the unit layer-forming step (S122), energy is applied to the resin material (resin powder 180) to form the unit layer. More specifically, energy is selectively applied to the layer of the resin powder 180 deposited on the stage 113 while adjusting the energy irradiation angle using the mirror 152 (see FIG. 11). The resin powder 180 is thus selectively cured to form the unit layer.

In the plasma irradiation step (S123), plasma is applied using the plasma irradiation mechanism 170 after the unit layer has been formed (after the step S122 that forms the nth layer has been performed (completed)) (see FIG. 12). According to the plasma irradiation step (S123), an anchor effect is achieved by moderately roughening the interface between the unit layers, and the interfacial strength (adhesion) between the unit layers is improved by forming the upper layer after breaking the polymer bonds on the surface of the unit layer. This makes it possible to improve the strength of the resulting object. In the second embodiment, the plasma irradiation step (S123) is performed immediately after the unit layer has been formed (immediately after the step S122). Note that the plasma irradiation step (S123) may be performed at another timing. For example, the plasma irradiation step (S123) may be performed between the step S124 and the step S125, or may be performed between the step S125 and the step S121. Specifically, the plasma treatment may be performed after forming the unit layer (after performing the step S122 that forms the nth layer), but before starting forming the next unit layer (before starting the step S121 that forms the (n+1)th layer).

In the next layer presence/absence determination step (S124), whether or not it is necessary to form the next unit layer is determined when the unit layer has been formed. When it is unnecessary to form the next unit layer, the desired three-dimensional object has been completed.

When it is necessary to form the next unit layer, the moving step (S125) is performed. In the moving step (S125), the stage 113 is moved in the −Z-direction by the thickness of the unit layer. After moving the stage 113 in the −Z-direction, the material supply step (S121) is performed (i.e., the resin powder 180 is supplied). The resin powder 180 is deposited on the resin powder layer deposited on the stage 113 by the last material supply step (S121), and the unit layer formed by the last unit layer-forming step (S122). The unit layer-forming step (S122) is performed on the resin powder to form the next unit layer.

In the second embodiment, the plasma irradiation mechanism 170 is not moved in the Z-axis direction. Therefore, the distance between the plasma irradiation mechanism 170 and the uncompleted object in the Z-axis direction can always be maintained constant during the unit layer-forming process.

As described above, the three-dimensional modeling device 200 according to the second embodiment includes the plasma irradiation mechanism 170. The method for producing an object according to the second embodiment includes the plasma irradiation step (S123). The state and the properties of the surface of the unit layer can be changed by applying plasma to the surface of the unit layer using the plasma irradiation mechanism 170. For example, an anchor effect (that is achieved by moderately roughening the surface of the unit layer), or an effect that breaks the polymer bonds on the surface of the unit layer can be implemented by the plasma treatment. The interfacial strength (adhesion) between the unit layers can be improved by providing the resin material for forming the next unit layer to the unit layer of which the surface has been modified. It is possible to control wettability at the interface between the unit layers, and improve the processing accuracy by selecting a gas species corresponding to the object, and performing the discharge treatment. This makes it possible to improve the accuracy and the strength of the resulting object.

1.3. Third Embodiment

The third embodiment illustrates a method for producing an object that utilizes powder binding lamination. The term "powder binding lamination" refers to a method that repeats a step that supplies a powdered base material (e.g., gypsum, ceramic, starch, or metal) in a layer, partially applies a liquid material (binder) that binds the base material, and cures the liquid material by applying energy to produce an object. The liquid material is a resin material. The raw material used in connection with the third embodiment, the configuration of the three-dimensional modeling device, the method for producing an object according to the third embodiment, and the modifications are described below.

1.3.1. Raw Material

A known material may be used as the base material. For example, a gypsum powder, a ceramic powder, a metal powder, or the like may be used. The volume average particle size of the powder (base material) is preferably 1 to 200 micrometers, more preferably 5 to 120 micrometers, and particularly preferably 10 to 100 micrometers, from the viewpoint of ensuring that the particles exhibit fluidity. The volume average particle size may be measured by using a device "Microtrac MT3300" manufactured by Nikkiso Co., Ltd.

The binder is not particularly limited as long as the binder is a liquid that can bind the powdered base material. It is preferable to use a curable liquid that polymerizes upon application of UV light. It is also possible to use a liquid material such as a curable liquid that promptly polymerizes upon contact with water (or oxygen or the like) contained in air.

1.3.2. Device Configuration

Figure 13:
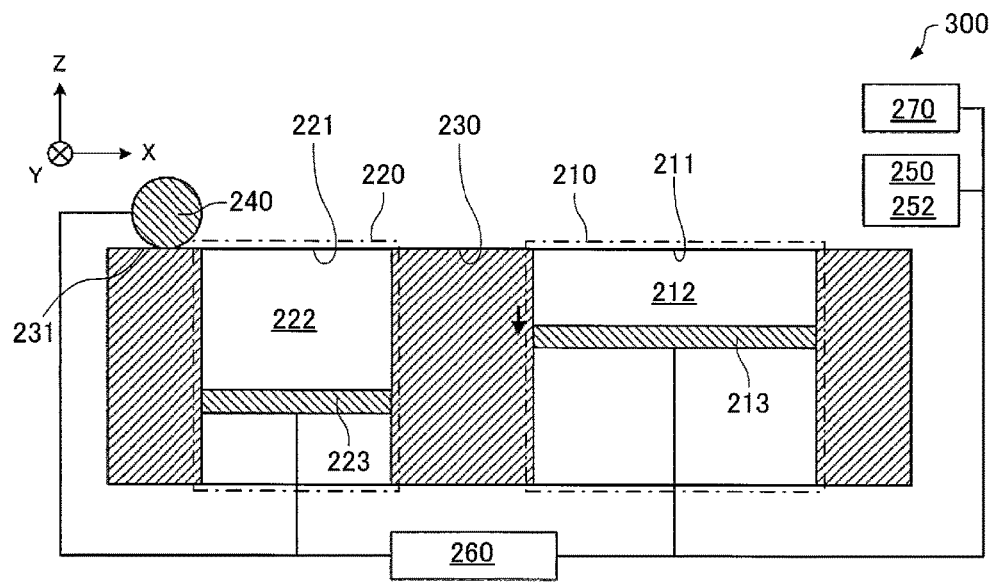
FIG. 13 is a diagram schematically illustrating an outline of the three-dimensional modeling device used in the third embodiment.
Figure 14:
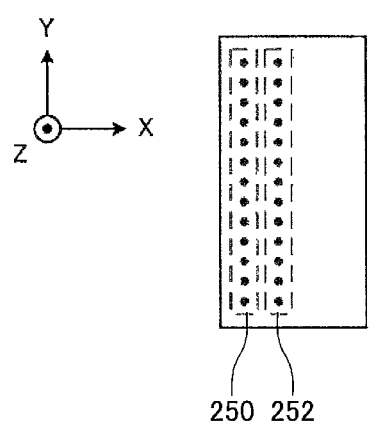
FIG. 14 is a plan view schematically illustrating the application mechanism and the energy irradiation mechanism of the three-dimensional modeling device used in the third embodiment.

FIG. 13 is a diagram schematically illustrating an outline of the three-dimensional modeling device used in the third embodiment. FIG. 14 is a plan view schematically illustrating an application mechanism and an energy irradiation mechanism of the three-dimensional modeling device used in the third embodiment. As illustrated in FIG. 13, a three-dimensional modeling device 300 includes a processing section 210 for modeling a three-dimensional object, and a supply section 220 that supplies a powdered base material (hereinafter may be referred to as "base material").

As illustrated in FIG. 13, the processing section 210 includes a pillar-like first space 212 and a stage 213. When the first space 212 is considered to be a geometrical pillar, the pillar has an upper side that extends along the XY plane, a bottom that extends along the XY plane, and a side that extends along the Z-axis direction. The first space 212 has an opening 211 that is parallel to the XY plane, and provided at the end of the first space 212 in the +Z-direction. The stage 213 is a work plane for modeling a three-dimensional object. The stage 213 is provided in the −Z-direction with respect to the first space 212. The upper side of the stage 213 is parallel to the XY plane. The stage 213 is configured to be movable within the first space 212 in the −Z-direction.

The supply section 220 includes a pillar-like second space 222 and a piston 223. When the second space 222 is considered to be a geometrical pillar, the pillar has an upper side that extends along the XY plane, a bottom that extends along the XY plane, and a side that extends along the Z-axis direction. The second space 222 has an opening 221 that is parallel to the XY plane, and provided at the end of the second space 222 in the +Z-direction. The piston 223 is provided in the −Z-direction with respect to the second space 222. The upper side of the piston 223 is parallel to the XY plane. The piston 223 is configured to be movable within the second space 222 in the +Z-direction. The base material is placed between the opening 221 and the upper side of the piston 223. The piston 223 pushes the base material upward in the +Z-direction at a given timing. The base material pushed by the piston 223 is slightly exposed from the second space 222 in the +Z-direction.

The three-dimensional modeling device 300 includes a connection surface 230 that connects the opening 211 of the first space 212 of the processing section 210 and the opening 221 of the second space 222 of the supply section 220, and a supply mechanism 240 that supplies the base material from the supply section 220 to the processing section 210.

The connection surface 230 is a surface that connects the opening 211 of the first space 212 of the processing section 210 and the opening 221 of the second space 222 of the supply section 220. The connection surface 230 is provided parallel to the XY plane. The connection surface 230 functions as a supply channel for transferring the base material from the supply section 220 to the processing section 210.

The supply mechanism 240 supplies the base material from the supply section 220 to the processing section 210. The supply mechanism 240 is normally provided on a surface 231 that is opposite to the connection surface 230 with respect to the supply section 220 in a plane view. The surface 231 is provided parallel to the XY plane. The supply mechanism 240 is a roller that has a cylindrical shape, and extends along the Y-direction. The roller is moved parallel to the XY plane while rotating and coming in contact with the connection surface 230. The base material that is exposed from the second space 222 of the supply section 220 in the +Z-axis direction is supplied to the first space 212 of the processing section 210 by moving the roller from the supply section 220 to the processing section 210. The roller is returned to the original position after the base material has been supplied to the first space 212 of the processing section 210. It suffices that the supply mechanism 240 has a function of supplying the base material from the supply section 220 to the processing section 210. Therefore, the supply mechanism 240 may be implemented by a non-rotating mechanism such as a squeegee.

The three-dimensional modeling device 300 includes an application mechanism 250 that selectively applies the binder (liquid material) to the base material supplied to the processing section 210, and an energy irradiation mechanism 252 that applies energy to the binder applied to the base material.

The application mechanism 250 selectively applies the binder to the base material supplied to the processing section 210. The application mechanism 250 is moved along the XY plane. The application mechanism 250 selectively applies the binder to the base material supplied to the opening 211 of the processing section 210 while being moved. The application mechanism 250 may be implemented by an inkjet head, for example.

The energy irradiation mechanism 252 applies energy to the binder applied by the application mechanism 250 to cure the binder. The energy irradiation mechanism 252 is moved along the XY plane. The energy irradiation mechanism 252 is implemented by a light source (e.g., UV light source) or a heat source (e.g., heater). The binder may be cured using the polymerization reaction of the resin material, for example. The energy irradiation mechanism 252 may be a line scan head that scans the binder with the energy in the X-direction or the Y-direction, or a serial scan head that scans the binder with the energy in the X-direction and the Y-direction. A surface-emitting energy irradiation means may be used as long as sufficient energy can be applied to the binder. In the example illustrated in FIG. 13, the application mechanism 250 and the energy irradiation mechanism 252 are integrated. Note that the application mechanism 250 and the energy irradiation mechanism 252 may not be integrated, and may be provided independently of each other.

FIG. 14 is a plan view schematically illustrating the application mechanism and the energy irradiation mechanism of the three-dimensional modeling device used in the third embodiment. In the example illustrated in FIG. 13, the application mechanism 250 and the energy irradiation mechanism 252 are integrated. As illustrated in FIG. 14, the application mechanism 250 and the energy irradiation mechanism 252 are implemented by a line scan head that extends along the Y-direction, and are placed along the Y-direction in rows. The application mechanism 250 is provided in the −X-direction with respect to the energy irradiation mechanism 252. The application mechanism 250 has a configuration in which a plurality of nozzles for applying the binder are provided in a row in the Y-direction. The energy irradiation mechanism 252 is provided in the +X-direction with respect to the application mechanism 250. The energy irradiation mechanism 252 has a configuration in which a plurality of light sources (e.g., LED) or heat sources for applying energy are provided in a row in the Y-direction.

The three-dimensional modeling device 300 includes a control section 260 that controls each mechanism based on the slice data. The processing section 210, the supply section 220, the supply mechanism 240, the application mechanism 250, the energy irradiation mechanism 252, and a plasma irradiation mechanism 270 (described later) are controlled by the control section 260. The control section 260 moves the piston 223 of the supply section 220 upward at a given timing so that the base material is slightly exposed in the +Z-direction. The control section 260 causes (drives) the supply mechanism 240 to supply the base material to the first space 212 of the processing section 210. The control section 260 causes the application mechanism 250 to apply the binder, and causes the energy irradiation mechanism 252 to apply energy toward the opening 211 of the processing section 210 so that the desired shape based on the slice data is formed. The control section 260 causes (drives) the plasma irradiation mechanism 270 to apply plasma at a given timing (described later). The control section 260 moves the stage 213 in the −Z-direction by the thickness of the unit layer after forming the unit layer, but before starting forming the next unit layer. The object corresponding to the three-dimensional CAD data can be produced by layering the unit layers by repeating the above operation.

The three-dimensional modeling device 300 includes the plasma irradiation mechanism 270. The plasma irradiation mechanism 270 applies plasma to the surface of the binder and the interface between the unit layers while being moved along the XY plane. The structure and the like (including the modifications) of the plasma irradiation mechanism 270 are the same as those of the plasma irradiation mechanism 70 described above in connection with the first embodiment, and description thereof is omitted. In the third embodiment, the plasma irradiation mechanism 270 is incorporated in the three-dimensional modeling device 300. Note that a plasma irradiation mechanism that is provided independently of the three-dimensional modeling device 300 may be connected to the control section 260, and driven by the control section 260.

1.3.3. Method for Producing Object

Figure 15:
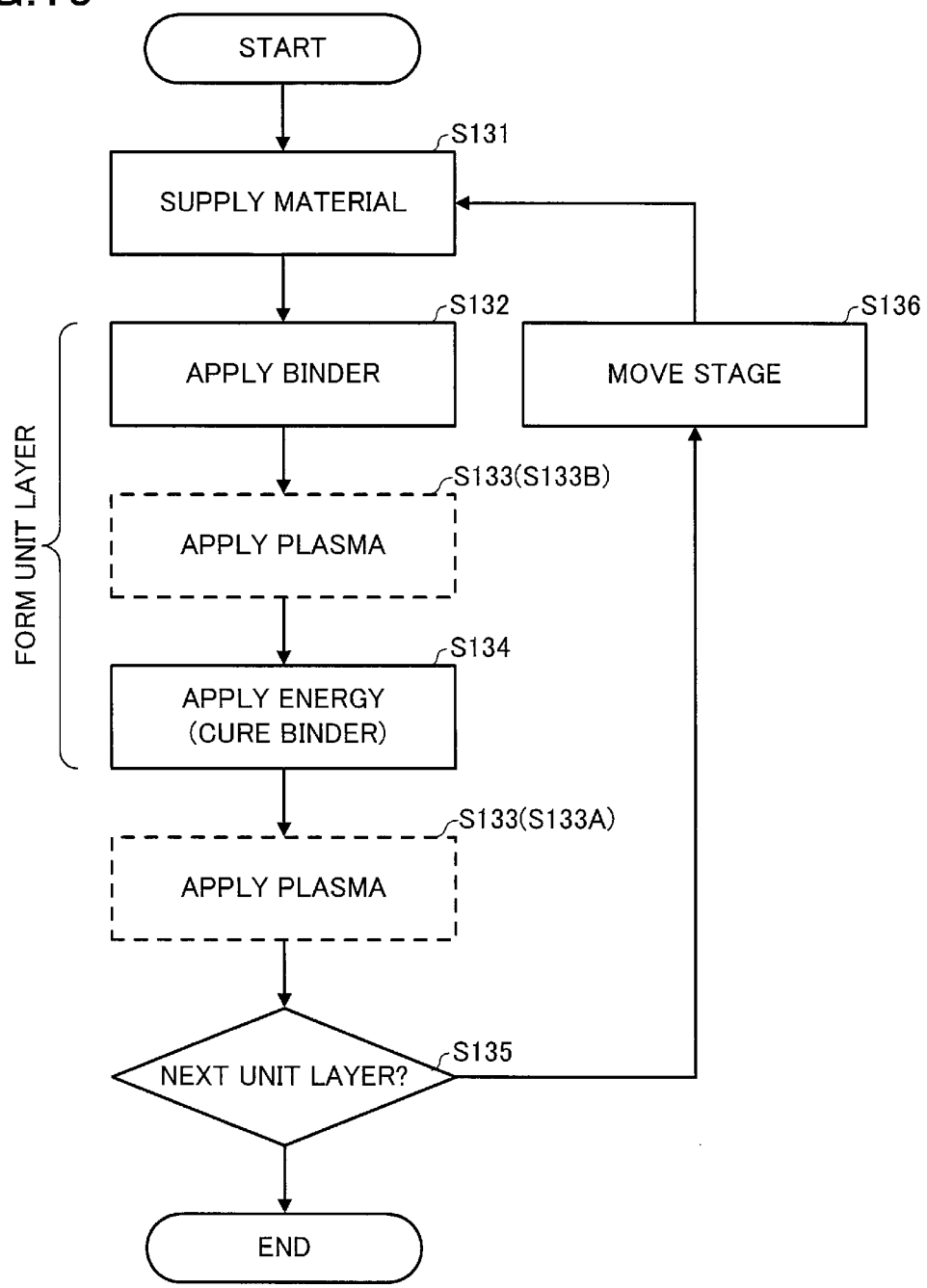
FIG. 15 is a flowchart illustrating an example of the modeling step included in the method for producing an object according to the third embodiment.
Figure 16:
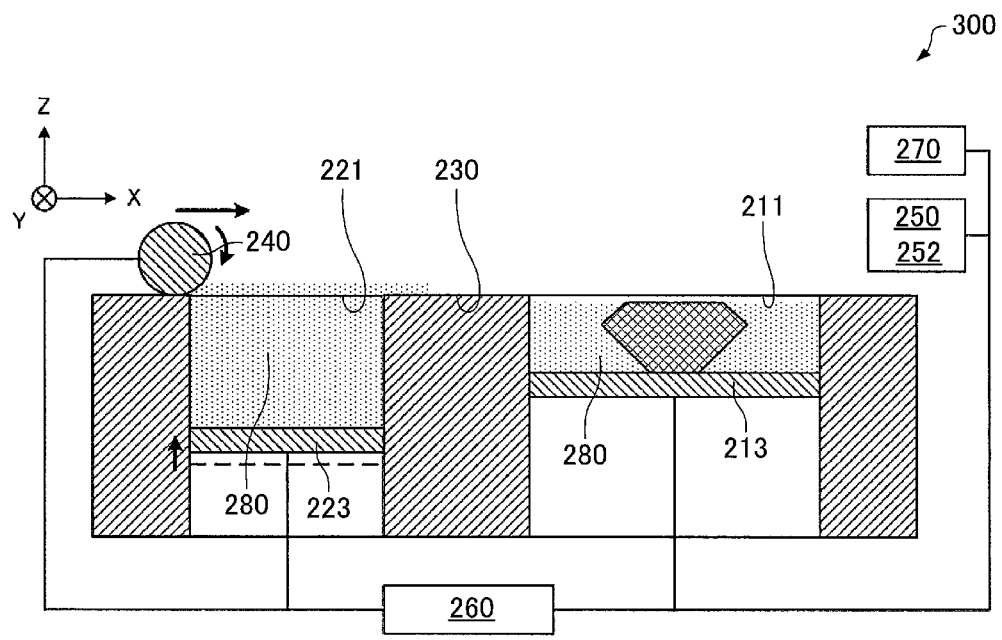
FIG. 16 is a diagram schematically illustrating the material supply step according to the third embodiment.
Figure 17:
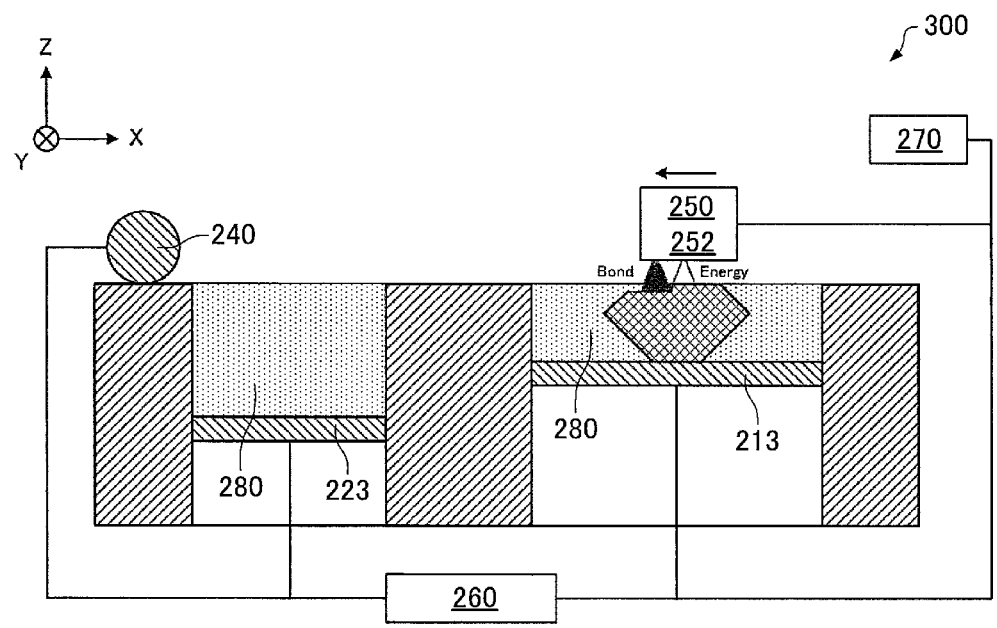
FIG. 17 is a diagram schematically illustrating the unit layer-forming step according to the third embodiment.
Figure 18:
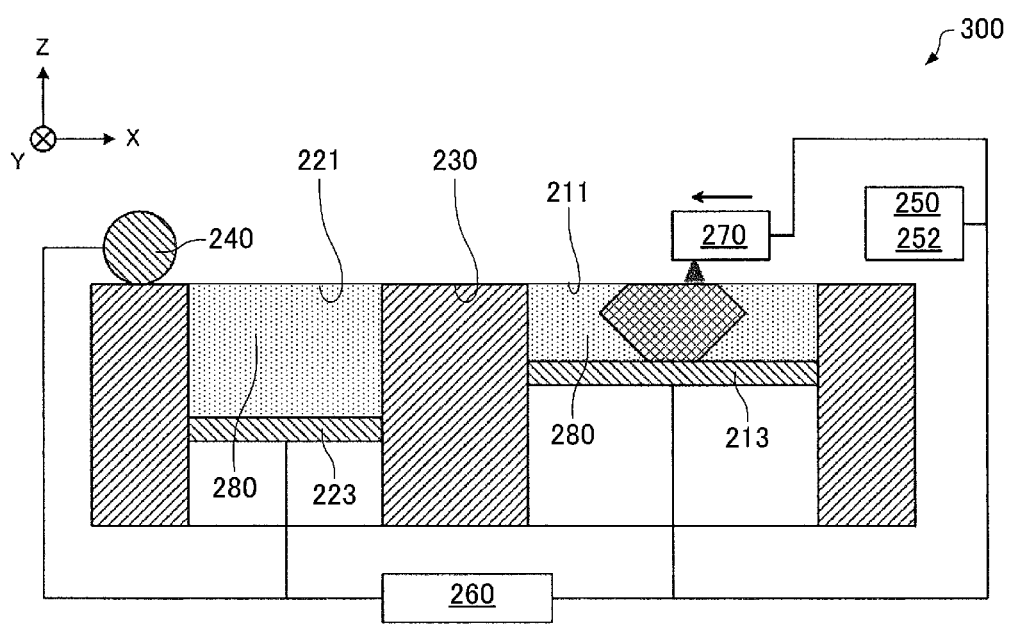
FIG. 18 is a diagram schematically illustrating the plasma irradiation step according to the third embodiment.

FIG. 15 is a flowchart illustrating an example of the modeling step in the method for producing an object according to the third embodiment. FIG. 16 is a diagram schematically illustrating the material supply step according to the third embodiment. FIG. 17 is a diagram schematically illustrating the unit layer-forming step according to the third embodiment. FIG. 18 is a diagram schematically illustrating the plasma irradiation step according to the third embodiment.

As illustrated in FIG. 1, the method for producing an object according to the third embodiment includes the three-dimensional data preparation step (S101), the slice data generation step (S102), and the modeling step (S103). The three-dimensional data preparation step (S101) and the slice data generation step (S102) are performed in the same manner as described above, and description thereof is omitted.

As illustrated in FIG. 15, the modeling step (S103) includes a material supply step (S131), a binder application step (S132), a plasma irradiation step (S133), an energy irradiation step (S134), a next layer presence/absence determination step (S135), and a moving step (S136). An object can be completed by repeating these steps. The steps are repeated corresponding to the number of pieces of slice data.

In the material supply step (S131), a base material 280 is supplied to the stage 213. As illustrated in FIG. 16, the piston 223 of the supply section 220 is moved upward in the +Z-direction to expose the base material 280 from the opening 221. The base material 280 exposed from the opening 221 is transferred to the processing section 210 by driving the supply mechanism 240 so as to push the base material 280. When forming the first layer, the stage 213 of the processing section 210 is positioned slightly in the −Z-direction with respect to the connection surface 230. Therefore, the base material is deposited on the stage 213 of the processing section 210 to a given thickness.

In the binder (resin material) application step (S132), the binder (resin material) is selectively applied to the base material 280 supplied to the stage 213. More specifically, the binder is selectively applied to the layer of the base material 280 deposited on the stage 213 while moving the application mechanism 250 along the XY plane (see FIG. 17). In the energy irradiation step (S134), energy is applied to the binder applied to the base material 280 using the energy irradiation mechanism 252 (see FIG. 16). The binder is thus cured to form the unit layer.

In the plasma irradiation step (S133), plasma is applied to the unit layer using the plasma irradiation mechanism 270 (see FIG. 18). Plasma is applied at either or both of the following timings A and B.

A: A timing after forming the unit layer (after performing the step S134 that forms the nth layer), but before starting forming the next unit layer (before starting the step S131 that forms the (n+1)th layer) (step S133A in FIG. 15)

B: A timing after performing the binder application step (S132), but before starting the energy irradiation step (S134) while forming the unit layer (step S133B in FIG. 15)

FIG. 18 illustrates the plasma irradiation step when plasma is applied at the timing A (step S133A in FIG. 15).

When the plasma irradiation step (S133A) is performed at the timing A, an anchor effect is achieved by moderately roughening the interface between the unit layers, and the interfacial strength (adhesion) between the unit layers is improved by forming the upper layer after breaking the polymer bonds on the surface of the unit layer. It is possible to control wettability at the interface between the unit layers, and improve the processing accuracy by selecting a gas species corresponding to the object, and performing the discharge treatment in the plasma irradiation step (S133A). In FIG. 15, the step S133A is performed immediately after the unit layer has been formed (immediately after the step S134). Note that the step S133A may be performed at another timing. For example, the step S133A may be performed between the step S135 and the step S136, or may be performed between the step S136 and the step S131.

Figure 19:
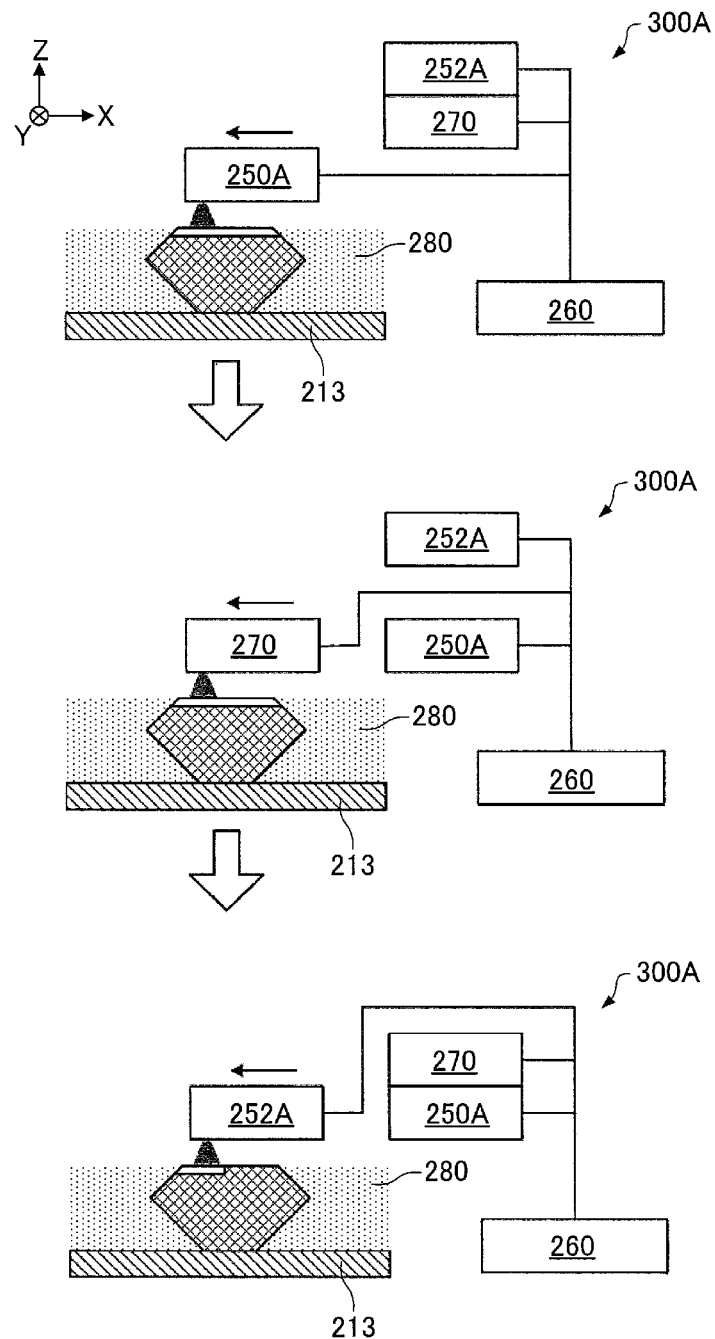
FIG. 19 is a diagram schematically illustrating the modification of the third embodiment.

Plasma may be applied at the timing B (step S133B in FIG. 15). FIG. 19 illustrates the binder application step (step S132 in FIG. 15), the plasma irradiation step (step S133B in FIG. 15), and the energy irradiation step (step S134 in FIG. 15) when plasma is applied at the timing B (step S133B in FIG. 15). Note that FIG. 19 illustrates only part of a three-dimensional modeling device 300A. The three-dimensional modeling device 300A illustrated in FIG. 19 differs from the three-dimensional modeling device 300 illustrated in FIG. 13 and the like in that the application mechanism 250 and the energy irradiation mechanism 252 are provided independently of each other. The three-dimensional modeling device 300A is configured in the same manner as the three-dimensional modeling device 300 except for the above feature.

When the plasma irradiation step (S133B) is performed at the timing B, a thin solid film is formed on the surface of the liquid material due to radicals generated by the discharge treatment, and it is expected that a pinning effect on the liquid material is achieved. Moreover, a paste layer formed after curing the liquid material easily becomes uniform. When the binder is a radiation-curable material, inhibition of polymerization on the surface of the binder due to oxygen can be reduced by performing the discharge treatment before curing the applied binder, and the radiation-curability of the binder is improved. This makes it possible to improve the accuracy and the strength of the resulting object.

In the next layer presence/absence determination step (S135), whether or not it is necessary to form the next unit layer is determined when the unit layer has been formed. When it is unnecessary to form the next unit layer, the desired three-dimensional object has been completed.

When it is necessary to form the next unit layer, the moving step (S136) is performed. In the moving step (S136), the stage 213 is moved in the −Z-direction by the thickness of the unit layer. After moving the stage 213 in the –Z-direction, the material supply step (S131) is performed (i.e., the base material 280 is supplied). The base material 280 is deposited to a given thickness on the base material layer deposited on the stage 213 by the last material supply step (S131), and the unit layer formed by the last unit layer-forming step. The steps S132 to S134 are performed on the base material to form the next unit layer.

In the third embodiment, the plasma irradiation mechanism 270 is not moved in the Z-axis direction. Therefore, the distance between the plasma irradiation mechanism 270 and the uncompleted object in the Z-axis direction can always be maintained constant during the unit layer-forming process.

As described above, the three-dimensional modeling device 300 according to the third embodiment includes the plasma irradiation mechanism 270. The method for producing an object according to the third embodiment includes the plasma irradiation step (S133) (S133A and S133B). The above advantageous effects can be achieved by performing the discharge treatment at the timing A (S133A) or the timing B (S133B) using the plasma irradiation mechanism 270.

When the plasma irradiation step (S133A) is performed at a timing after forming the unit layer (after performing the step S134 that forms the nth layer), but before starting forming the next unit layer (before starting the step S131 that forms the (n+1)th layer), an anchor effect is achieved by moderately roughening the interface between the unit layers, and the interfacial strength (adhesion) between the unit layers is improved by forming the upper layer after breaking the polymer bonds on the surface of the unit layer. It is possible to control wettability at the interface between the unit layers, and improve the processing accuracy by selecting a gas species corresponding to the object, and performing the discharge treatment in the plasma irradiation step (S133). This makes it possible to improve the accuracy and the strength of the resulting object.

When the plasma irradiation step (S133B) is performed at a timing after performing the binder application step (S132), but before performing the energy irradiation step (S134), a thin solid film is formed on the surface of the liquid material due to radicals generated by the discharge treatment, and it is expected that a pinning effect on the liquid material is achieved. Moreover, a paste layer formed after curing the liquid material easily becomes uniform. When the binder is a radiation-curable material, inhibition of polymerization on the surface of the binder due to oxygen can be reduced by performing the discharge treatment before curing the applied binder, and the radiation-curability of the binder is improved. This makes it possible to improve the accuracy and the strength of the resulting object.

1.3.4. Modifications of Third Embodiment

The three-dimensional modeling device 300 illustrated in FIG. 13 and the like is configured so that the application mechanism 250 and the energy irradiation mechanism 252 are integrated. Note that the application mechanism 250 and the energy irradiation mechanism 252 may be provided independently of each other. The application mechanism 250, the energy irradiation mechanism 252, and the plasma irradiation mechanism 270 may be integrated. The three-dimensional modeling device illustrated in FIG. 19 is configured so that the application mechanism 250A, the energy irradiation mechanism 252A, and the plasma irradiation mechanism 270 are provided independently of each other.

Note that the application mechanism 250 and the plasma irradiation mechanism 270 may be integrated, or the plasma irradiation mechanism 270 and the energy irradiation mechanism 252 may be integrated, or the application mechanism 250, the energy irradiation mechanism 252, and the plasma irradiation mechanism 270 may be integrated. The head that implements these mechanisms may be a line scan head that moves in the X-direction or the Y-direction, or a serial scan head that moves in the X-direction and the Y-direction.

1.4. Fourth Embodiment

The fourth embodiment illustrates a method for producing an object that utilizes a paste method. The term "paste method" refers to a method that repeats a step that supplies a paste prepared by mixing a powdered base material (main material for forming an object) with an amphiphilic solid polymer or the like in order to prevent a situation in which the base material scatters, partially applies a liquid material (binder) that binds the base material included in the paste, and cures the liquid material by applying energy to produce an object. The paste includes a resin material. The binder is a resin material. The raw material used in connection with the fourth embodiment, the configuration of the three-dimensional modeling device, and the method for producing an object according to the fourth embodiment are described below.

1.4.1. Raw Material

A known material may be used as the powdered base material. For example, organic particles such as an acrylic resin powder, a silicone resin powder, an acrylic-silicone resin powder, a polyethylene resin powder, a polyethylene-acrylic acid copolymer resin powder, or starch, or inorganic particles such as gypsum, ceramic, metal, or silica may be used. These organic particles and inorganic particles may be completely spherical or porous.

Examples of the amphiphilic polymer that provides viscosity include polyvinyl alcohol, sodium carboxymethyl cellulose, sodium polyacrylate, carrageenan, xanthan gum, and the like.

The paste may be prepared by mixing the base material, the amphiphilic polymer, an aqueous medium, and an optional additive (e.g., antifoaming agent) using a mixer such as a kneader.

The liquid material for binding the base material included in the paste is not particularly limited as long as the liquid material is a liquid that can cure the paste. It is preferable to use a curable liquid that polymerizes upon application of UV light. It is also possible to use a liquid material such as a curable liquid that promptly polymerizes upon contact with water (or oxygen or the like) contained in air.

1.4.2. Device Configuration

Figure 20:
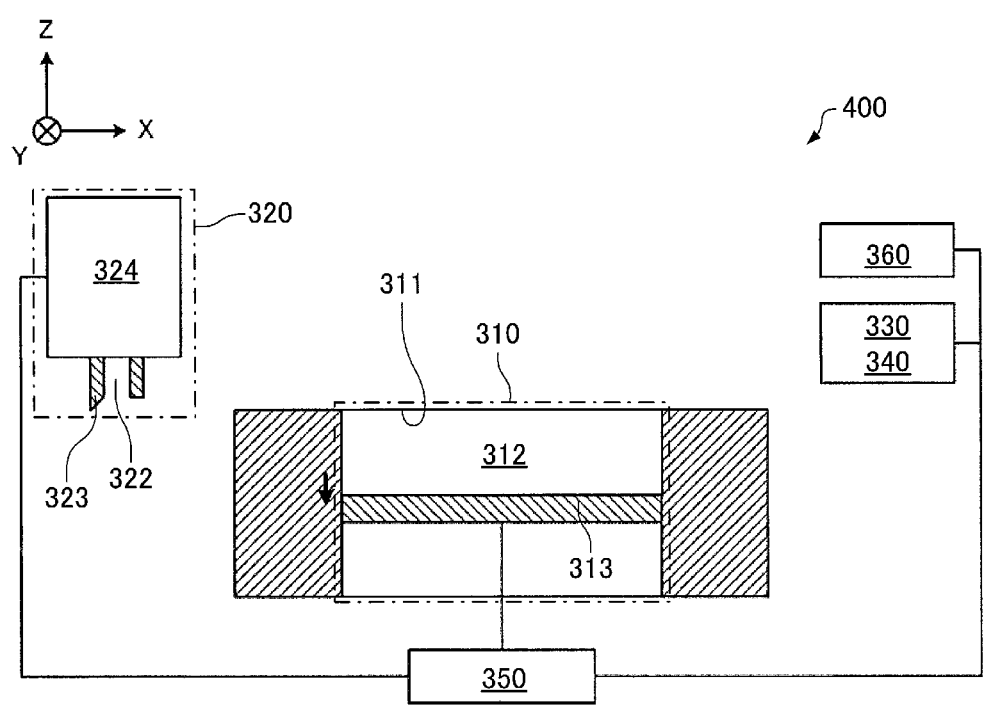
FIG. 20 is a diagram schematically illustrating an outline of the three-dimensional modeling device used in the fourth embodiment.

FIG. 20 is a diagram schematically illustrating an outline of the three-dimensional modeling device used in the fourth embodiment. As illustrated in FIG. 20, a three-dimensional modeling device 400 includes a processing section 310 for modeling a three-dimensional object, and a supply mechanism 320 that supplies the paste (material) to the processing section 310.

As illustrated in FIG. 20, the processing section 310 includes a pillar-like space 312 and a stage 313. When the space 312 is considered to be a geometrical pillar, the pillar has an upper side that extends along the XY plane, a bottom that extends along the XY plane, and a side that extends along the Z-axis direction. The space 312 has an opening 311 that is parallel to the XY plane, and provided at the end of the space 312 in the +Z-direction. The stage 313 is a work plane for modeling a three-dimensional object. The stage 313 is provided in the −Z-direction with respect to the space 312. The upper side of the stage 313 is parallel to the XY plane. The stage 313 is configured to be movable within the space 312 in the −Z-direction.

The supply mechanism 320 includes a nozzle 322 for supplying the paste (material) to the processing section 310, and a paste storage section 324. The nozzle 322 is provided almost vertically (+Z-direction) with respect to the stage 313. The supply mechanism 320 may include a planarization mechanism 323 that planarizes the paste applied to the stage 313. The planarization mechanism 323 is implemented by a squeegee that is provided at the end of the nozzle 322. The planarization mechanism 323 is provided in the −X-direction with respect to the nozzle 322. The paste is supplied to the processing section 310 from the nozzle 322 while moving the supply mechanism 320 in the +X-direction (see FIG. 22). The planarization mechanism 323 is moved so as to stroke the surface of the paste supplied to the processing section 310 along with the movement of the supply mechanism 320. The paste is planarized by moving the planarization mechanism 323 so as to stroke the surface of the paste. The planarization mechanism 323 may be implemented by a roller. The planarization mechanism 323 may be provided independently of the nozzle 322.

A spin coating method that supplies the paste to the center of the stage 313 while rotating the stage 313 may be used instead of forming the paste layer having a uniform thickness on the stage 313 by moving the supply mechanism 320 and the planarization mechanism 323.

The three-dimensional modeling device 400 includes an application mechanism 330 that selectively applies the liquid material to the paste supplied to the processing section 310, and an energy irradiation mechanism 340 that applies energy to the liquid material applied to the paste.

The application mechanism 330 selectively applies the liquid material to the paste layer supplied to the processing section 310. The application mechanism 330 is moved along the XY plane. The application mechanism 330 selectively applies the liquid material to the paste layer supplied to the opening 311 of the processing section 310 while being moved. The application mechanism 330 may be implemented by an inkjet head, for example.

The energy irradiation mechanism 340 applies energy to the liquid material (binder) applied by the application mechanism 330 to cure the liquid material. The energy irradiation mechanism 340 is moved along the XY plane. The energy irradiation mechanism 340 is implemented by a light source (e.g., UV light source) or a heat source (e.g., heater). The liquid material may be cured using the polymerization reaction of the resin material, for example. In the example illustrated in FIG. 20, the application mechanism 330 and the energy irradiation mechanism 340 are integrated. Note that the application mechanism 330 and the energy irradiation mechanism 340 may not be integrated, and may be provided independently of each other.

The three-dimensional modeling device 400 includes a control section 350 that controls each mechanism based on the slice data. The supply mechanism 320, the processing section 310, the application mechanism 330, the energy irradiation mechanism 340, and a plasma irradiation mechanism 360 (described later) are controlled by the control section 350. The control section 350 causes (drives) the supply mechanism 320 to supply the paste to the stage 313. The control section 350 causes the application mechanism 330 to apply the liquid material, and causes the energy irradiation mechanism 340 to apply energy toward the opening 311 of the processing section 310 so that the desired shape based on the slice data is formed. The control section 350 causes (drives) the plasma irradiation mechanism 360 to apply plasma at a given timing (described later). The control section 350 moves the stage 313 in the −Z-direction by the thickness of the unit layer after forming the unit layer, but before starting forming the next unit layer. The object corresponding to the three-dimensional CAD data can be produced by layering the unit layers by repeating the above operation.

The three-dimensional modeling device 400 includes the plasma irradiation mechanism 360. The plasma irradiation mechanism 360 applies plasma to the surface of the paste layer, the surface of the liquid material, or the interface between the unit layers while being moved along the XY plane. The structure and the like (including the modifications) of the plasma irradiation mechanism 360 are the same as those of the plasma irradiation mechanism 70 described above in connection with the first embodiment, and description thereof is omitted. In the fourth embodiment, the plasma irradiation mechanism 360 is incorporated in the three-dimensional modeling device 400. Note that a plasma irradiation mechanism that is provided independently of the three-dimensional modeling device 400 may be connected to the control section 350, and driven by the control section 350.

1.4.3. Method for Producing Object

Figure 21:
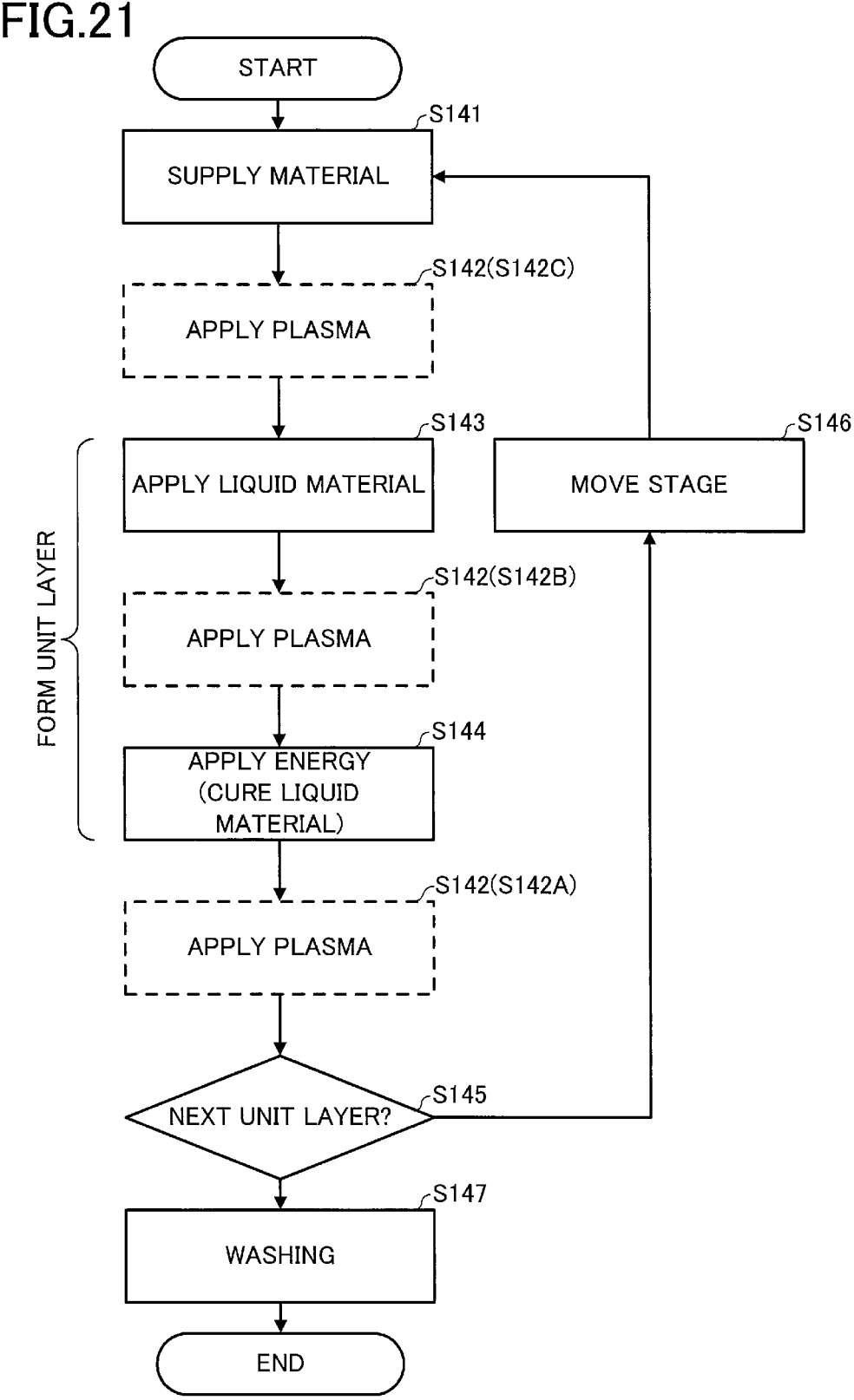
FIG. 21 is a flowchart illustrating an example of the modeling step in the method for producing an object according to the fourth embodiment.
Figure 22:
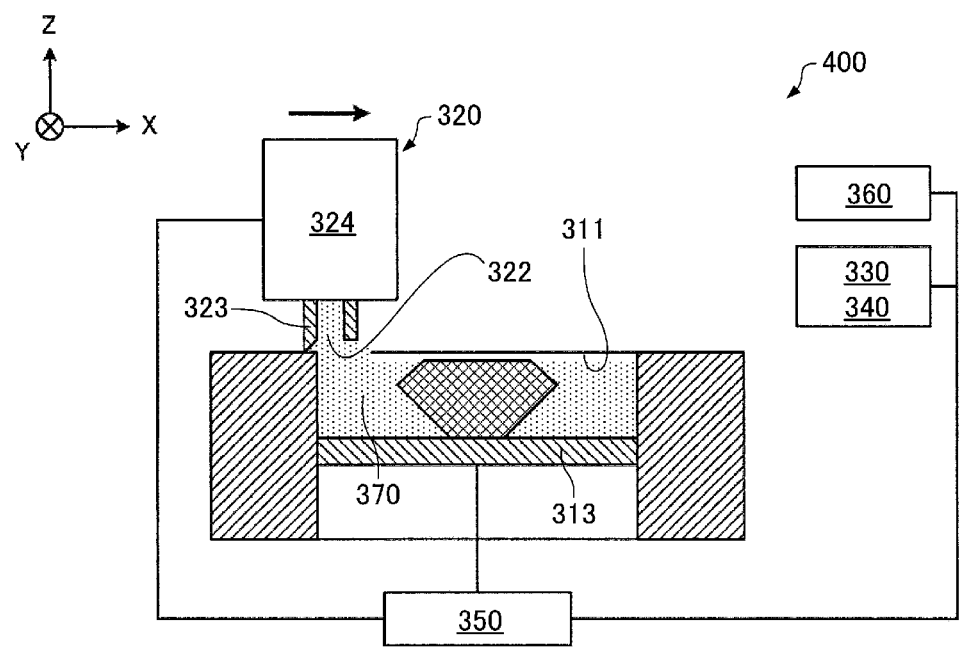
FIG. 22 is a diagram schematically illustrating the material supply step according to the fourth embodiment.
Figure 23:
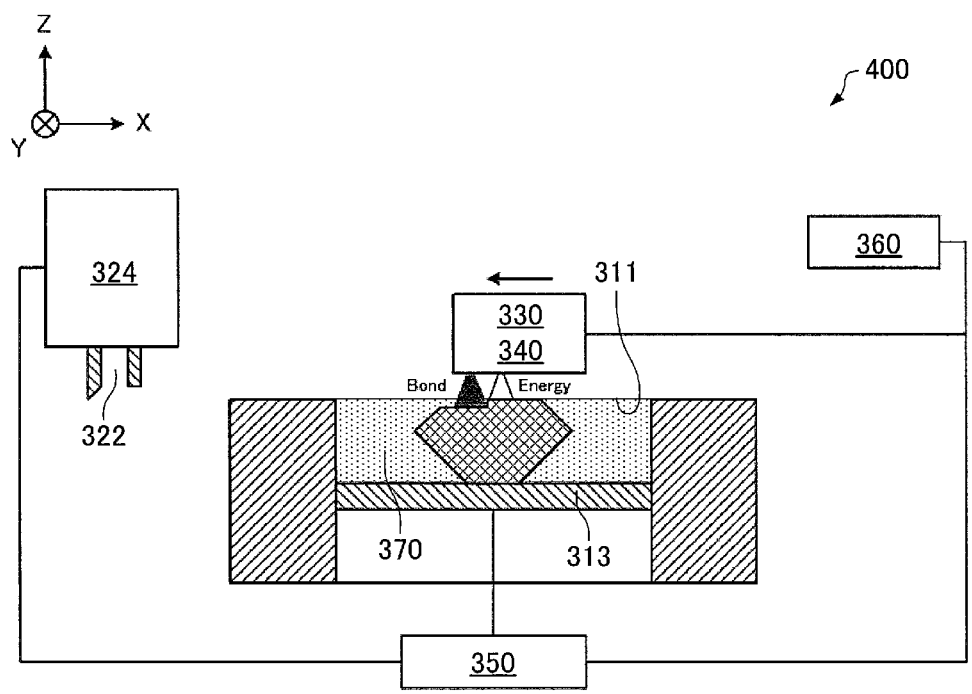
FIG. 23 is a diagram schematically illustrating the unit layer-forming step according to the fourth embodiment.
Figure 24:
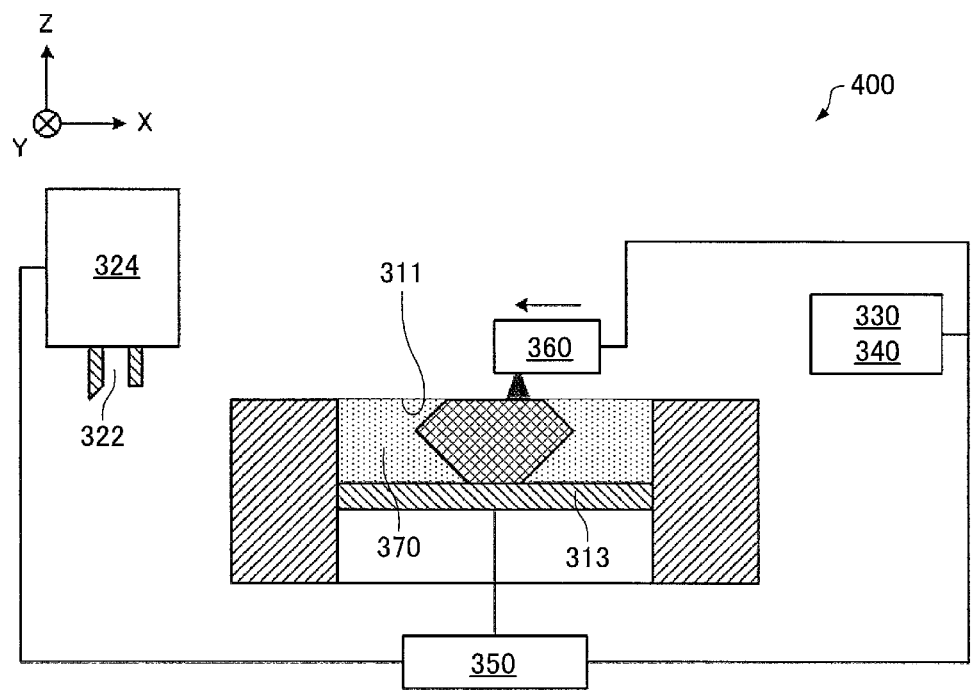
FIG. 24 is a diagram schematically illustrating the plasma irradiation step according to the fourth embodiment.

FIG. 21 is a flowchart illustrating an example of the modeling step in the method for producing an object according to the fourth embodiment. FIG. 22 is a diagram schematically illustrating the material supply step according to the fourth embodiment. FIG. 23 is a diagram schematically illustrating the unit layer-forming step according to the fourth embodiment. FIG. 24 is a diagram schematically illustrating the plasma irradiation step according to the fourth embodiment.

As illustrated in FIG. 1, the method for producing an object according to the fourth embodiment includes the three-dimensional data preparation step (S101), the slice data generation step (S102), and the modeling step (S103). The three-dimensional data preparation step (S101) and the slice data generation step (S102) are performed in the same manner as described above, and description thereof is omitted.

As illustrated in FIG. 21, the modeling step (S103) includes a material supply step (S141), a plasma irradiation step (S142), a liquid material application step (S143), an energy irradiation step (S144), a next layer presence/absence determination step (S145), a moving step (S146), and a washing step (S147). An object can be completed by repeating these steps. The steps are repeated corresponding to the number of pieces of slice data.

In the material supply step (S141), a paste 370 is supplied to the upper side of the stage 313 from the end of the nozzle 322 (see FIG. 22). Note that the paste 370 is supplied so that the paste 370 is slowly placed on the upper side of the stage 313 while moving the nozzle 322 in the +X-direction as if to squeeze toothpaste out of a tube, and place the toothpaste on a toothbrush. In the fourth embodiment, the supply mechanism 320 includes the line nozzle 322 that extends in the Y-direction. A quadrangular paste layer is formed in the XY plane by supplying the paste 370 while moving the nozzle 322 in the +X-direction. The nozzle 322 may be a serial nozzle. When using a serial nozzle, the paste 370 is supplied from the end of the nozzle 322 in a single stroke while moving the nozzle 322 in the X-direction and the Y-direction. In the material supply step (S141), the planarization mechanism 323 is moved so as to stroke the surface of the paste supplied to the processing section 310 along with the movement of the supply mechanism 320. The planarization mechanism 323 planarizes the paste by being moved so as to stroke the surface of the paste. In the fourth embodiment, the paste layer is planarized while supplying the paste 370. Note that the paste layer may be planarized after supplying the paste 370 to the stage 313.

In the liquid material application step (S143), the liquid material is selectively applied to the paste 370 supplied to the stage 313. More specifically, the liquid material is selectively applied to the layer of the paste 370 deposited on the stage 313 while moving the application mechanism 330 along the XY plane (see FIG. 23). In the energy irradiation step (S144), energy is applied to the liquid material applied to the paste 370 using the energy irradiation mechanism 340 (see FIG. 23). The liquid material is thus cured to form the unit layer.

In the plasma irradiation step (S142), plasma is applied to the unit layer using the plasma irradiation mechanism 360 (see FIG. 24). Plasma is applied at least one of the following timings A to C.

A: A timing after forming the unit layer (after performing the step S144 that forms the nth layer), but before starting forming the next unit layer (before starting the step S141 that forms the (n+1)th layer) (step S142A in FIG. 21)

B: A timing after performing the liquid material application step (S142), but before performing the energy irradiation step (S144) when forming the unit layer (step S142B in FIG. 21)

C: A timing after performing the material supply step (S141), but before performing the liquid material application step (S142) before forming the unit layer (step S142C in FIG. 21)

FIG. 24 illustrates the plasma irradiation step when plasma is applied at the timing A.

When the plasma irradiation step (S142A) is performed at the timing A, an anchor effect is achieved by moderately roughening the interface between the unit layers, and the interfacial strength (adhesion) between the unit layers is improved by forming the upper layer after breaking the polymer bonds on the surface of the unit layer. It is possible to control wettability at the interface between the unit layers, and improve the processing accuracy by selecting a gas species corresponding to the object, and performing the discharge treatment in the plasma irradiation step (S142A). In FIG. 21, the step S142A is performed immediately after the unit layer has been formed (immediately after the step S144). Note that the step S142A may be performed at another timing. For example, the step S142A may be performed between the step S145 and the step S146, or may be performed between the step S146 and the step S141.

When the plasma irradiation step (S142B) is performed at the timing B, a thin solid film is formed on the surface of the liquid material due to radicals generated by the plasma treatment, and it is expected that a pinning effect on the liquid material is achieved. Moreover, a paste layer formed after curing the liquid material easily becomes uniform. When the liquid material is a radiation-curable material, inhibition of polymerization on the surface of the liquid material due to oxygen can be reduced, and the radiation-curability of the liquid material is improved. This makes it possible to improve the accuracy and the strength of the resulting object.

When the plasma irradiation step (S142C) is performed at the timing C, it is possible to control the wettability and the permeability of the paste layer and the liquid material by selecting a gas species corresponding to the object, and performing the discharge treatment. Moreover, the interface between the paste layer and the cured liquid material can be adjusted. This makes it possible to improve the accuracy and the strength of the resulting object.

In the next layer presence/absence determination step (S145), whether or not it is necessary to form the next unit layer is determined when the unit layer has been formed.

When it is necessary to form the next unit layer, the moving step (S146) is performed. In the moving step (S146), the stage 313 is moved in the −Z-direction by the thickness (Δd) of the unit layer. Note that the nozzle 322 may be moved in the +Z-direction by the thickness (Δd) of the unit layer instead of moving the stage 313 in the −Z-direction. The distance between the nozzle 322 and the uncompleted object in the Z-axis direction can always be maintained constant during the unit layer-forming process by performing the moving step (S146).

When the nozzle 322 is moved in the +Z-direction by the thickness (Δd) of the unit layer in the moving step (S146), the plasma irradiation mechanism 360 is also moved in the +Z-direction by the thickness (Δd) of the unit layer. When the stage 313 is moved in the −Z-direction by the thickness (Δd) of the unit layer, the plasma irradiation mechanism 360 is not moved in the Z-direction. Therefore, the distance between the plasma irradiation mechanism 360 and the uncompleted object in the Z-axis direction can always be maintained constant during the unit layer-forming process.

When it is unnecessary to form the next unit layer, the washing step (S147) is performed. In the washing step (S147), the paste that is not bound by the binder is washed away. In the washing step (S147), the paste may be washed using water, for example. The target object is thus obtained.

As described above, the three-dimensional modeling device 400 according to the fourth embodiment includes the plasma irradiation mechanism 360. The method for producing an object according to the fourth embodiment includes the plasma irradiation step (S142) (S142A, S142B, and S142C). The above advantageous effects can be achieved by performing the discharge treatment at the timing A (S142A), the timing B (S142B), or the timing C (S142C) using the plasma irradiation mechanism 360.

The three-dimensional modeling device 400 illustrated in FIG. 20 and the like is configured so that the application mechanism 330 and the energy irradiation mechanism 340 are integrated. Note that the application mechanism 330 and the energy irradiation mechanism 340 may be provided independently of each other. The application mechanism 330, the energy irradiation mechanism 340, and the plasma irradiation mechanism 360 may be integrated. The application mechanism 330 and the plasma irradiation mechanism 360 may be integrated, or the plasma irradiation mechanism 360 and the energy irradiation mechanism 340 may be integrated. The head that implements these mechanisms may be a line scan head that moves in the X-direction or the Y-direction, or a serial scan head that moves in the X-direction and the Y-direction. A surface-emitting energy irradiation means may be used as the energy irradiation mechanism 340 as long as sufficient energy can be applied to the liquid material.

1.5. Fifth Embodiment

The fifth embodiment illustrates a method for producing an object that utilizes an inkjet method. The term "inkjet method" refers to a method that repeats a step that discharges an ink that includes a resin material that cures upon application of energy (e.g., light or heat) from an inkjet head so that a given shape is formed, and cures the ink to produce an object. The ink used in connection with the fifth embodiment, the configuration of the three-dimensional modeling device, and the method for producing an object according to the fifth embodiment are described below.

1.5.1. Ink

An ink that includes a known resin material that cures upon application of energy (e.g., light or heat) may be used as the ink. Specific examples of the ink include an ink that includes at least a polymerizable compound (e.g., monofunctional ethylenically unsaturated monomer or polyfunctional ethylenically unsaturated monomer) and an initiator, and optionally includes a polymerization inhibitor, a surfactant, a coloring agent (e.g., pigment), an antioxidant, a chain transfer agent, a filler (e.g., metal powder or silica), and the like.

1.5.2. Device Configuration

Figure 25:
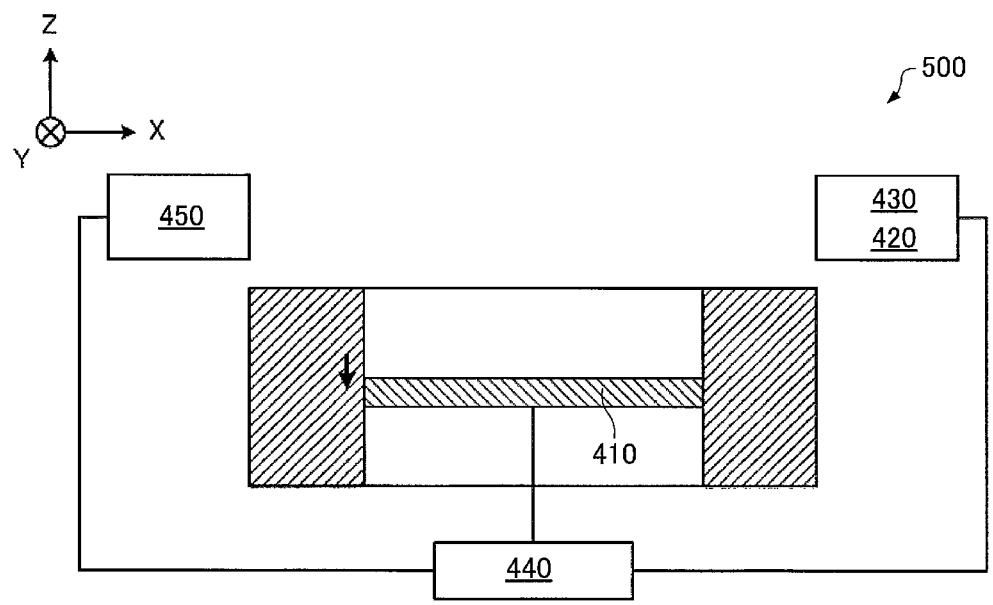
FIG. 25 is a diagram schematically illustrating an outline of the three-dimensional modeling device used in the fifth embodiment.

FIG. 25 is a diagram schematically illustrating an outline of the three-dimensional modeling device used in the fifth embodiment. As illustrated in FIG. 25, a three-dimensional modeling device 500 includes a stage 410 for modeling a three-dimensional object.

As illustrated in FIG. 25, the stage 410 is a work plane for modeling a three-dimensional object. The upper side of the stage 410 is parallel to the XY plane. The stage 410 is configured to be movable in the −Z-direction.

The three-dimensional modeling device 500 includes an inkjet head 420 that discharges the ink to the stage 410, and an energy irradiation mechanism 430 that applies energy to the discharged ink.

The inkjet head 420 discharges the ink to a given position on the stage 410. The ink may be discharged from the nozzle of the inkjet head 420 using a method that applies a strong electric field between a nozzle and an accelerating electrode placed in front of the nozzle to successively discharge ink droplets from the nozzle, and supplies a recording information signal to deflection electrodes while the ink droplets travel between the deflection electrodes to record an image, or a method that discharges ink droplets corresponding to the recording information signal without deflecting the ink droplets (electrostatic attraction method), a method that discharges ink droplets by applying a pressure to the ink using a small pump, and mechanically vibrating a nozzle using a crystal vibrator or the like, a method that applies a pressure and a recording information signal to an ink using a piezoelectric element to discharge and record ink droplets (piezo method), a method that causes an ink to be foamed with heating using a micro-electrode according to a recording information signal to discharge and record ink droplets (thermal jet method), or the like. The ink is supplied to the stage 410 to form the shape corresponding to the slice data.

The inkjet head 420 and the stage 410 are configured as described below in order to supply the ink so as to form the shape corresponding to the slice data.

(1) The inkjet head 420 is movable in both the X-direction and the Y-direction. The stage 410 is fixed in the X-direction and the Y-direction.
(2) The inkjet head 420 is movable in the X-direction, and fixed in the Y-direction. The stage 410 is movable in the Y-direction, and fixed in the X-direction.
(3) The stage 410 is movable in both the X-direction and the Y-direction. The inkjet head 420 is fixed in the X-direction and the Y-direction.
(4) The inkjet head 420 is a line scan head that can cover the entire area in the X-direction. The line scan head is movable in the Y-direction. The stage 410 is fixed in the X-direction and the Y-direction.
(5) The inkjet head 420 is a line scan head that can cover the entire area in the X-direction. The line scan head is fixed in the X-direction and the Y-direction. The stage 410 is movable in the Y-direction.

The three-dimensional modeling device 500 according to the fifth embodiment employs the configuration (1).

The inkjet head 420 may be integrally provided with a planarization mechanism that planarizes the ink layer formed on (discharged to) the stage 410. The planarization mechanism may be provided independently of the inkjet head 420. Examples of the planarization mechanism include a mechanism having a wiping-off function, such as a squeegee. Note that it is unnecessary to provide the planarization mechanism when the ink layer formed on (discharged to) the stage 410 has a uniform thickness.

The energy irradiation mechanism 430 cures the discharged ink by applying energy. The energy irradiation mechanism 430 is moved along the XY plane. The energy irradiation mechanism 430 is implemented by a light source (e.g., UV light source) or a heat source (e.g., heater). The ink may be cured using the polymerization reaction of the resin material, for example. In the example illustrated in FIG. 25, the inkjet head 420 and the energy irradiation mechanism 430 are integrated. Note that the inkjet head 420 and the energy irradiation mechanism 430 may not be integrated, and may be provided independently of each other.

The three-dimensional modeling device 500 includes a control section 440 that controls each mechanism based on the slice data. The stage 410, the inkjet head 420, the energy irradiation mechanism 430, and a plasma irradiation mechanism 450 (described later) are controlled by the control section 440. The control section 440 causes (drives) the inkjet head 420 to discharge the ink to the stage 410 so that the desired shape based on the slice data is formed. The control section 440 causes the energy irradiation mechanism 430 to apply energy to the ink layer formed on the stage 410. The control section 440 causes (drives) the plasma irradiation mechanism 450 to apply plasma at a given timing (described later). The control section 440 moves the stage 410 in the −Z-direction by the thickness of the unit layer after forming the unit layer, but before starting forming the next unit layer. The object corresponding to the three-dimensional CAD data can be produced by layering the unit layers by repeating the above operation.

The three-dimensional modeling device 500 includes the plasma irradiation mechanism 450. The plasma irradiation mechanism 450 applies plasma to the surface of the ink and the interface between the unit layers while being moved along the XY plane. The structure and the like (including the modifications) of the plasma irradiation mechanism 450 are the same as those of the plasma irradiation mechanism 70 described above in connection with the first embodiment, and description thereof is omitted. In the fifth embodiment, the plasma irradiation mechanism 450 is incorporated in the three-dimensional modeling device 500. Note that a plasma irradiation mechanism that is provided independently of the three-dimensional modeling device 500 may be connected to the control section 440, and driven by the control section 440.

1.5.3. Method for Producing Object

Figure 26:
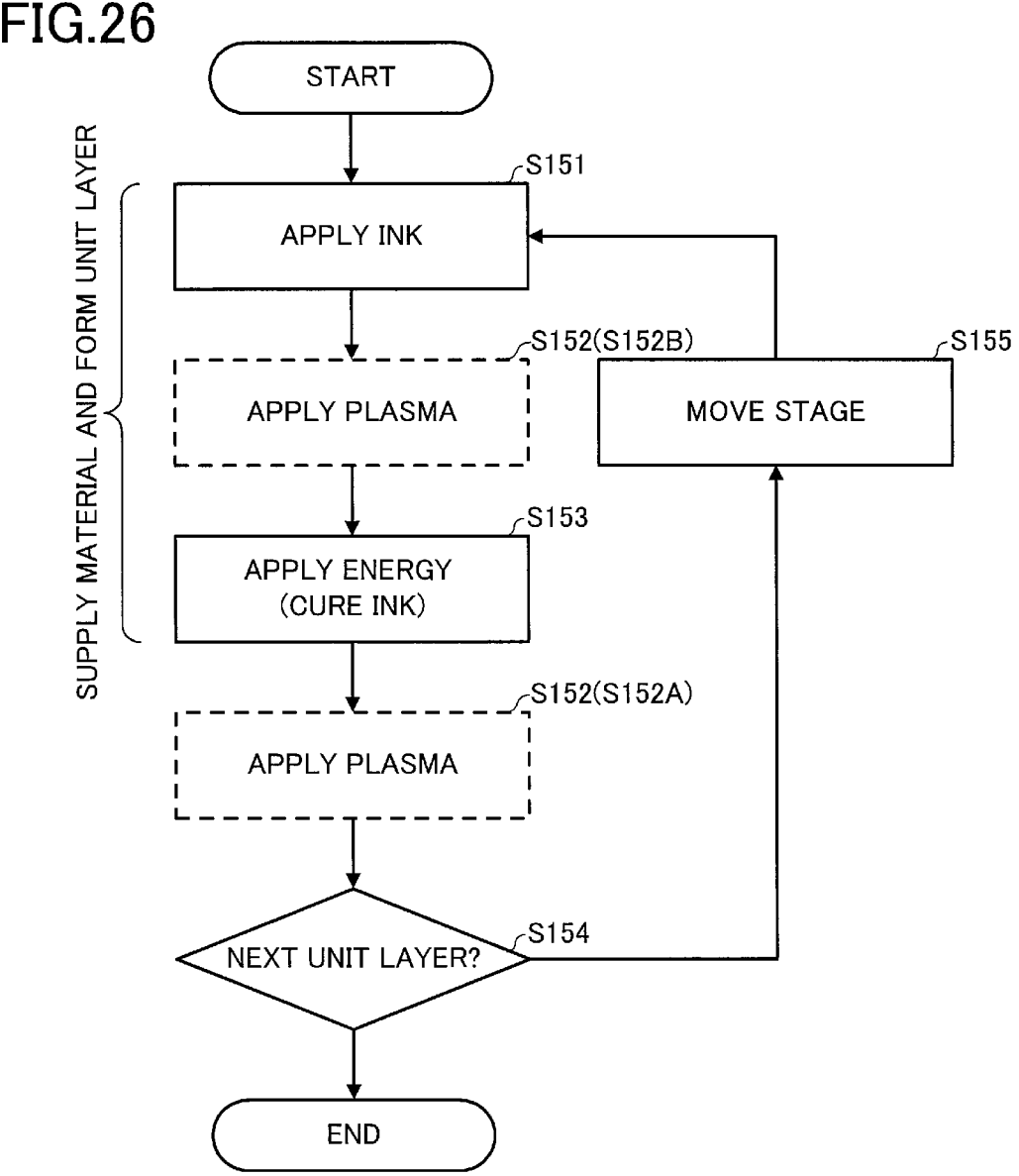
FIG. 26 is a flowchart illustrating an example of the modeling step in the method for producing an object according to the fifth embodiment.
Figure 27:
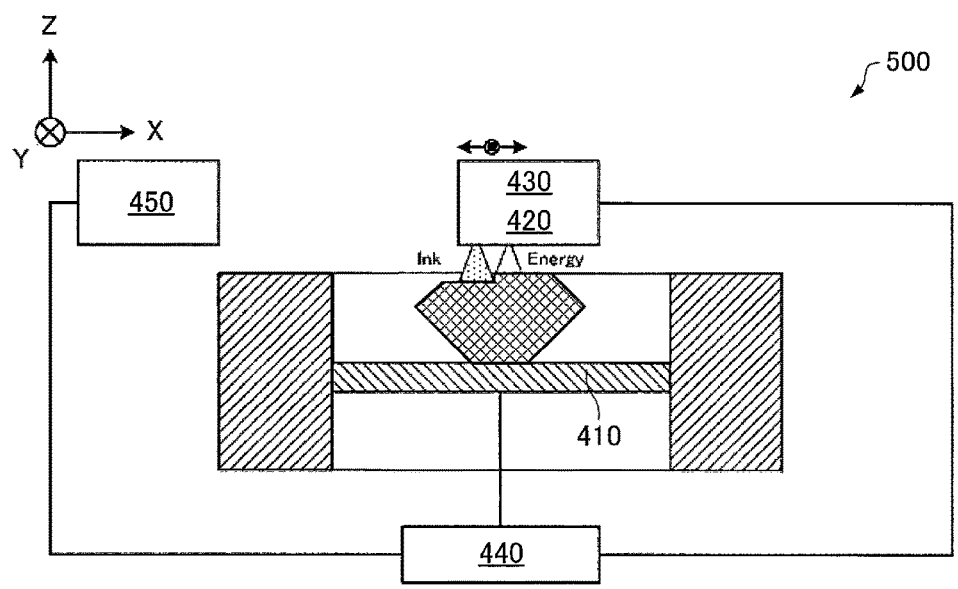
FIG. 27 is a diagram schematically illustrating the material supply step and the unit layer-forming step according to the fifth embodiment.
Figure 28:
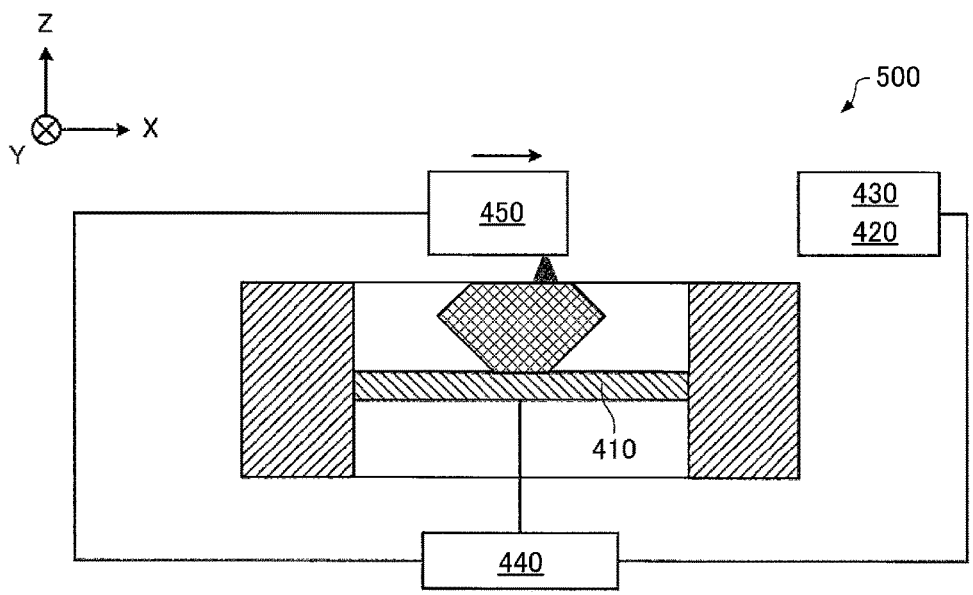
FIG. 28 is a diagram schematically illustrating the plasma irradiation step according to the fifth embodiment.

FIG. 26 is a flowchart illustrating an example of the modeling step in the method for producing an object according to the fifth embodiment. FIG. 27 is a diagram schematically illustrating the material supply step and the unit layer-forming step according to the fifth embodiment. FIG. 28 is a diagram schematically illustrating the plasma irradiation step according to the fifth embodiment.

As illustrated in FIG. 1, the method for producing an object according to the fifth embodiment includes the three-dimensional data preparation step (S101), the slice data generation step (S102), and the modeling step (S103). The three-dimensional data preparation step (S101) and the slice data generation step (S102) are performed in the same manner as described above, and description thereof is omitted.

As illustrated in FIG. 26, the modeling step (S103) includes an ink application step (S151), a plasma irradiation step (S152), an energy irradiation step (S153), a next layer presence/absence determination step (S154), and a moving step (S155). An object can be completed by repeating these steps. The steps are repeated corresponding to the number of pieces of slice data.

In the ink application step (S151), the ink is discharged from the inkjet head 420 toward the upper side of the stage 410 (see FIG. 27). Specifically, the ink is discharged to form the shape corresponding to the slice data while moving the inkjet head 420 along the XY plane.

In the energy irradiation step (S153), energy is applied to the discharged ink using the energy irradiation mechanism 430 (see FIG. 27). The ink layer is thus cured to form the unit layer. In the fifth embodiment, the inkjet head 420 that is integrally provided with the energy irradiation mechanism 430 is a serial scan head, and the unit layer is formed while moving the inkjet head 420 (the energy irradiation mechanism 430) in the X-direction and the Y-direction. Note that the inkjet head 420 may be a line scan head, and the unit layer may be formed while moving the inkjet head 420 (the energy irradiation mechanism 430) in the X-direction or the Y-direction.

In the plasma irradiation step (S152), plasma is applied to the unit layer using the plasma irradiation mechanism 450 (see FIG. 28). Plasma is applied at either or both of a timing after forming the unit layer (after performing the step S153 that forms the nth layer), but before starting forming the next unit layer (before starting the step S151 that forms the (n+1)th layer) (step S152A in FIG. 26), and a timing after performing the ink application step (S151), but before starting the energy irradiation step (S153) while forming the unit layer (step S152B in FIG. 26). FIG. 28 illustrates the plasma irradiation step when plasma is applied at a timing after forming the unit layer (after performing the step S153 that forms the nth layer), but before starting forming the next unit layer (before starting the step S151 that forms the (n+1)th layer) (step S152A in FIG. 26).

When plasma is applied at a timing after forming the unit layer (after performing the step S153 that forms the nth layer), but before starting forming the next unit layer (before starting the step S151 that forms the (n+1)th layer) (step S152A in FIG. 26), an ink layer is uniformly formed on the cured ink layer. Moreover, an anchor effect is achieved by moderately roughening the interface between the unit layers, and the interfacial strength (adhesion) between the unit layers is improved by forming the upper layer after breaking the polymer bonds on the surface of the unit layer. It is possible to control wettability at the interface between the unit layers, and improve the processing accuracy by selecting a gas species corresponding to the object, and performing the discharge treatment in the plasma irradiation step (S152A). This makes it possible to improve the accuracy and the strength of the resulting object. In FIG. 26, the step S152A is performed immediately after the unit layer has been formed (immediately after the step S153). Note that the step S152A may be performed at another timing. For example, the step S152A may be performed between the step S154 and the step S155, or may be performed between the step S155 and the step S151.

When plasma is applied at a timing after performing the ink application step (S151), but before performing the energy irradiation step (S153) (step S152B in FIG. 26), a thin solid film is formed on the surface of the ink layer due to radicals generated by applying plasma, and it is expected that a pinning effect on the ink is achieved. Moreover, an ink layer formed after curing the ink easily becomes uniform. When the ink is a radiation-curable material, inhibition due to oxygen can be reduced, and the radiation-curability of the ink is improved. This makes it possible to improve the accuracy and the strength of the resulting object.

In the next layer presence/absence determination step (S154), whether or not it is necessary to form the next unit layer is determined when the unit layer has been formed. When it is unnecessary to form the next unit layer, the desired three-dimensional object has been completed.

When it is necessary to form the next unit layer, the moving step (S155) is performed. In the moving step (S155), the stage 410 is moved in the −Z-direction by the thickness (Δd) of the unit layer. Note that the inkjet head 420 may be moved in the +Z-direction by the thickness (Δd) of the unit layer instead of moving the stage 410 in the −Z-direction. The distance between the inkjet head 420 and the uncompleted object in the Z-axis direction can always be maintained constant during the unit layer-forming process by performing the moving step (S155).

When the inkjet head 420 is moved in the +Z-direction by the thickness (Δd) of the unit layer in the moving step (S155), the plasma irradiation mechanism 450 is also moved in the +Z-direction by the thickness (Δd) of the unit layer. When the stage 410 is moved in the −Z-direction by the thickness (Δd) of the unit layer, the plasma irradiation mechanism 450 is not moved in the Z-direction. Therefore, the distance between the plasma irradiation mechanism 450 and the uncompleted object in the Z-axis direction can always be maintained constant during the unit layer-forming process.

As described above, the three-dimensional modeling device 500 according to the fifth embodiment includes the plasma irradiation mechanism 450. The method for producing an object according to the fifth embodiment includes the plasma irradiation step (S152) (S152A and S152B). The above advantageous effects can be achieved by performing the discharge treatment at the above timing (S152A or S152B) using the plasma irradiation mechanism 450.

The three-dimensional modeling device 500 illustrated in FIG. 25 and the like is configured so that the inkjet head 420 is integrally provided with the energy irradiation mechanism 430. Note that the inkjet head 420 and the energy irradiation mechanism 430 may be provided independently of each other. The inkjet head 420 may be integrally provided with the energy irradiation mechanism 430 and the plasma irradiation mechanism 450. The energy irradiation mechanism 430 and the plasma irradiation mechanism 450 may be integrated, or the plasma irradiation mechanism 450 and the inkjet head 420 may be integrated. The head that implements these mechanisms may be a line scan head that moves in the X-direction or the Y-direction, or a serial scan head that moves in the X-direction and the Y-direction. A surface-emitting energy irradiation means may be used as the energy irradiation mechanism 430 as long as sufficient energy can be applied to the ink.

1.5.4. Modifications

In the ink application step (S151) according to the fifth embodiment, an ink for forming a support layer may be discharged in addition to the ink for forming the unit layer.

When the unit layer that forms the upper layer differs in shape from the unit layer that forms the lower layer, and part of the unit layer that forms the upper layer is not supported by the unit layer that forms the lower layer, it is necessary to support such a part of the unit layer that forms the upper layer using a support layer. In this case, the ink for forming the unit layer and the ink for forming the support layer may be discharged from the inkjet head 420 in the ink application step (S151) to form the unit layer and the support layer.

An ink that includes a known resin material that cures upon application of energy (e.g., light or heat) may be used as the ink for forming the support layer. It is preferable to use an ink that exhibits excellent solubility in water or a specific solvent. Since the support layer is unnecessary after the object has been completed, it is preferable to form the support layer using a material that can be easily removed by washing the object with water or a specific solvent (i.e., a solvent that does dissolve the material that forms the object, and dissolves only the material that forms the support layer).

2. Examples

The invention is further described below by way of examples. Note that the invention is not limited to the following examples.

2.1. Examples 1 to 4 and Comparative Examples 1 and 2

In Examples 1 to 4 and Comparative Examples 1 and 2, a three-dimensional object was produced by fused deposition modeling. Specifically, the thermoplastic resin shown below was supplied to the upper end of the nozzle, and melted by heating the thermoplastic resin using the heating mechanism provided inside the nozzle. The molten thermoplastic resin was supplied from the nozzle toward the upper side of the stage to form the unit layer. The plasma treatment was performed using the discharge device shown below under the conditions shown below at a timing after forming the unit layer, but before starting forming the next unit layer. The three-dimensional object was produced by repeating the above operation. The tensile strength and the flexural strength of the resulting object were evaluated. The results are shown in Table 1.

<Three-Dimensional Modeling Device>
Lunavast Prusa V2
<Thermoplastic Resin>
Acrylonitrile-butadiene-styrene (ABS) resin
Polycarbonate (PC) resin <Discharge Device and Discharge Treatment Conditions>
Corona type: "Air Plasma APW602f" manufactured by Kasuga Denki, Inc., output: 1.5 kVA, processing (scan) speed: 3 cm/s, irradiation distance: 10 mm
Plasma type: remote jet plasma generation device illustrated in FIG. 3, gas species: oxygen, gas flow rate: 30 L/min, irradiation distance: 2.5 mm, irradiation time: 0.8 sec, power: 100 Wh, frequency: 13.56 MHz
<Evaluation Method>
The tensile strength was evaluated in accordance with ASTM D638.
The flexural strength was evaluated in accordance with ASTM D638.

TABLE 1

| | Example 1 | Example 2 | Example 3 | Example 4 | Comparative Example 1 | Comparative Example 2 |
|---|---|---|---|---|---|---|
| Thermoplastic resin | ABS | PC | ABS | PC | ABS | PC |
| Discharge treatment | Corona | Corona | Plasma | Plasma | — | — |
| Tensile strength (MPa) | 47.3 | 71.9 | 48.1 | 73.5 | 34.2 | 63.5 |
| Flexural strength (MPa) | 66.2 | 61.4 | 66.9 | 62.1 | 51.9 | 53.1 |

It was confirmed from the above results that the objects produced using the discharge treatment exhibited excellent tensile strength and excellent flexural strength as compared with the objects produced without using the discharge treatment.

2.2. Examples 5 to 7 and Comparative Example 3

In Examples 5 to 7 and Comparative Example 3, a three-dimensional object was produced using the paste method. Specifically, the modeling slurry and the liquid material were prepared as described below. The modeling slurry was applied to the stage from the modeling slurry supply mechanism to form a paste layer. The liquid material (clear ink) was discharged from the ink jet nozzle to a given position on the paste layer. UV light (irradiation intensity: 1 W/cm$^2$, peak wavelength: 395 nm) was applied from the UV-LED provided in the UV irradiation device mounted next to the carriage to form a unit layer. The plasma treatment was performed using the discharge device shown below under the conditions shown below at a timing after forming the unit layer, but before starting forming the next unit layer. The three-dimensional object was produced by repeating the above operation. The tensile strength and the flexural strength of the resulting object were evaluated. The results are shown in Table 2.

<Three-Dimensional Modeling Device>
Inkjet recording device including modeling slurry supply mechanism and piezo-type inkjet nozzle
<Modeling Slurry>
The modeling slurry was prepared by mixing 7 parts by mass of an acrylic-silicone resin powder ("Chaline R-170S" manufactured by Nissin Chemical Industry Ltd., particle size: 30 micrometers), 0.22 parts by mass of polyvinyl alcohol ("POVAL JP-05" manufactured by Japan Vam & Poval Co., Ltd., degree of polymerization: 500, degree of saponification: 87.0 to 89.0), 0.66 parts by mass of an antifoaming agent ("MEGAFAC F-477" manufactured by DIC Corporation), and 3.1 parts by mass of ion-exchanged water.

<Liquid Material>

Clear Ink 20 parts by mass of 2-(2-vinyloxyethoxy)ethyl acrylate ("VEEA" manufactured by Nippon Shokubai Co., Ltd.), 35 parts by mass of phenoxyethyl acrylate ("Viscoat #192" manufactured by Osaka Organic Chemical Industry, Ltd.), 34.6 parts by mass of dipropylene glycol diacrylate ("NK Ester APG-100" manufactured by Shin-Nakamura Chemical Co., Ltd.), 4 parts by mass of IRGACURE 819 (manufactured by BASF, initiator), 4 parts by mass of DAROCURE TPO (manufactured by BASF, initiator), 2 parts by mass of KAYACURE DETX-S (manufactured by Nippon Kayaku Co., Ltd., initiator), 0.2 parts by mass of hydroquinone monomethyl ether (manufactured by Kanto Chemical Co., Inc., polymerization inhibitor), and 0.2 parts by mass of BYK-UV3500 (manufactured by BYK, silicone-based surfactant) were mixed, and stirred using a high-speed water-cooled stirrer to prepare a clear ink.

Cyan Ink 20 parts by mass of 2-(2-vinyloxyethoxy)ethyl acrylate ("VEEA" manufactured by Nippon Shokubai Co., Ltd.), 35 parts by mass of phenoxyethyl acrylate ("Viscoat #192" manufactured by Osaka Organic Chemical Industry, Ltd.), 31.6 parts by mass of dipropylene glycol diacrylate ("NK Ester APG-100" manufactured by Shin-Nakamura Chemical Co., Ltd.), 4 parts by mass of IRGACURE 819 (manufactured by BASF, initiator), 4 parts by mass of DAROCURE TPO (manufactured by BASF, initiator), 2 parts by mass of KAYACURE DETX-S (manufactured by Nippon Kayaku Co., Ltd., initiator), 0.2 parts by mass of hydroquinone monomethyl ether (manufactured by Kanto Chemical Co., Inc., polymerization inhibitor), 0.2 parts by mass of BYK-UV3500 (manufactured by BYK, silicone-based surfactant), and 3 parts by mass of C.I. Pigment Blue 15:3 (manufactured by DIC Corporation, phthalocyanine blue) were mixed, and stirred using a high-speed water-cooled stirrer to prepare a cyan ink.

<Discharge Device and Discharge Treatment Conditions>

Corona type: "Air Plasma APW602f" manufactured by Kasuga Denki, Inc., output: 1.5 kVA, processing (scan) speed: 3 cm/s, irradiation distance: 10 mm Plasma type A: remote jet plasma generation device illustrated in FIG. 3, gas species: oxygen, gas flow rate: 30 L/min, irradiation distance: 2.5 mm, irradiation time: 0.8 sec, power: 100 Wh, frequency: 13.56 MHz Plasma type B: remote jet plasma generation device illustrated in FIG. 3, gas species: nitrogen, gas flow rate: 30 L/min, irradiation distance: 2.5 mm, irradiation time: 0.8 sec, power: 100 Wh, frequency: 13.56 MHz <Evaluation Method>

The tensile strength was evaluated in accordance with ASTM D638.

The flexural strength was evaluated in accordance with ASTM D638.

TABLE 2

|  | Example 5 | Example 6 | Example 7 | Comparative Example 3 |
| --- | --- | --- | --- | --- |
| Discharge treatment | Corona | Plasma A | Plasma B | — |
| Tensile strength (MPa) | 48.1 | 49.9 | 46.8 | 39.2 |
| Flexural strength (MPa) | 33.5 | 34.2 | 32.9 | 21.5 |

It was confirmed from the above results that the objects produced using the discharge treatment exhibited excellent tensile strength and excellent flexural strength as compared with the object produced without using the discharge treatment.

2.3. Examples 8 to 10 and Comparative Example 4

In Examples 8 to 10 and Comparative Example 4, a three-dimensional object was produced using the paste method. The three-dimensional object was produced in the same manner as described above (see Examples 5 to 7 and Comparative Example 3), except that the discharge treatment was performed at a timing after forming the paste layer, but before discharging the liquid material, and the three-dimensional object was formed in the shape of a 2 cm cube. Characters (4 pt) were printed on the resulting 2 cm cube using the cyan ink at a depth of 100 micrometers from the upper side and each side. The visibility of the printed characters (4 pt) was evaluated in accordance with the following standard. The results are shown in Table 3.

<Evaluation of Visibility of Printed Characters (4 pt)>

1: The characters could be clearly observed.
2: The characters could be observed, but blurred.
3: The characters could not be observed.

TABLE 3

|  | Example 8 | Example 9 | Example 10 | Comparative Example 4 |
| --- | --- | --- | --- | --- |
| Discharge treatment | Corona | Plasma A | Plasma B | — |
| Tensile strength (MPa) | 41.2 | 44.6 | 40.1 | 39.2 |
| Flexural strength (MPa) | 28.3 | 29.4 | 27.3 | 21.5 |
| Visibility of characters (4 pt) | 2 | 2 | 1 | 3 |

It was confirmed from the above results that the objects produced using the discharge treatment exhibited excellent tensile strength and excellent flexural strength as compared with the objects produced without using the discharge treatment. It was also confirmed that the objects produced using the discharge treatment were precisely produced since the characters (4 pt) printed on the objects could be clearly observed.

The invention is not limited to the above embodiments. Various modifications and variations may be made of the above embodiments. For example, the invention includes various other configurations that are substantially the same as the configurations described in connection with the above embodiments (e.g., a configuration having the same function, method, and results, or a configuration having the same objective and results). The invention also includes a configuration in which an unsubstantial section (part) described in connection with the above is replaced by another section (part). The invention also includes a configuration having the same effects as those of the configurations described in connection with the above embodiments, or a configuration capable of achieving the same objective as that of the configurations described in connection with the above embodiments. The invention further includes a configuration in which a known technique is added to the configurations described in connection with the above embodiments.

What is claimed is:

1. A method for producing an object that includes forming and laying N unit layers into which an object is divided, sequentially from a first layer to an Nth layer, using a resin material as a material, or using a resin material for implementing a step, to form the object, the method comprising:
    performing a discharge treatment at either or both of a timing while forming a unit layer among the N unit layers, and a timing after forming the unit layer, but before starting forming a next unit layer among the N unit layers,
    wherein the discharge treatment includes:
        emitting a plasma from a plasma irradiation mechanism of an apparatus and then irradiating at least a part of the N unit layers with the plasma, the plasma being generated by applying a voltage to a gas in a discharge portion from a plasma irradiation port;
        supplying the gas into an inside of a gas supply chamber of the apparatus, the gas supply chamber being in a longitudinal shape extending in an extending direction, the discharge portion being provided at the inside of the gas supply chamber; and
        exhausting and discharging the gas from an exhaust member of the apparatus, the exhaust member being located on an outer surface of the gas supply chamber and extending along the outer surface of the gas supply chamber in the extending direction.

2. The method for producing an object as defined in claim 1,
    the resin material being a thermoplastic resin that melts due to heating,
    the method comprising supplying the resin material that has been melted to a stage, and curing the resin material to form the unit layer.

3. The method for producing an object as defined in claim 1,
    the resin material being a powdered resin material,
    the method comprising:
    supplying the powdered resin material to a stage, and partially curing the powdered resin material to form the unit layer; and
    performing the discharge treatment after forming the unit layer, but before starting forming the next unit layer.

4. The method for producing an object as defined in claim 1, comprising:
    supplying a powdered base material to a stage, applying a liquid material that includes the resin material that binds powder particles in the powdered base material, and curing the liquid material to form the unit layer; and
    performing the discharge treatment at either or both of a timing after applying the liquid material, but before curing the liquid material, and a timing after forming the unit layer, but before starting forming the next unit layer.

5. The method for producing an object as defined in claim 4,
    the applying of the liquid material including discharging the liquid material using an inkjet method.

6. The method for producing an object as defined in claim 1, comprising:
    forming a paste layer that includes a powdered base material, applying a liquid material that includes the resin material that binds powder particles in the powdered base material to the paste layer, and curing the liquid material to form the unit layer; and
    performing the discharge treatment at least one timing among a timing after forming the paste layer, but before applying the liquid material, a timing after applying the liquid material, but before curing the liquid material, and a timing after curing the liquid material, but before starting forming the next unit layer.

7. The method for producing an object as defined in claim 6,
    the applying of the liquid material including discharging the liquid material using an inkjet method.

8. The method for producing an object as defined in claim 1, comprising:
    applying a liquid material that includes the resin material using an inkjet method, and curing the liquid material by applying energy to the liquid material to form the unit layer; and
    performing the discharge treatment at either or both of a timing after applying the liquid material, but before curing the liquid material, and a timing after curing the liquid material, but before starting forming the next unit layer.

9. The method for producing an object as defined in claim 1,
    the discharge treatment being performed in an atmosphere that includes an inert gas.

10. The method for producing an object as defined in claim 1,
    the discharge treatment being performed in an atmosphere that includes oxygen.

11. The method for producing an object as defined in claim 1,
    the discharge treatment being performed in an atmosphere that includes fluorine.

* * * * *